United States Patent [19]

Oku et al.

[11] Patent Number: 5,559,382
[45] Date of Patent: Sep. 24, 1996

[54] SPINDLE MOTOR

[75] Inventors: Yoshito Oku, Osaka; Shozo Ibara; Shigeharu Sumi, both of Kyoto; Hiromasa Fujii, Kyoto, all of Japan

[73] Assignee: Nidec Corporation, Kyoto, Japan

[21] Appl. No.: 129,658

[22] Filed: Sep. 30, 1993

[30] Foreign Application Priority Data

| Oct. 1, 1992 | [JP] | Japan | 4-289471 |
| Dec. 4, 1992 | [JP] | Japan | 4-350887 |
| Dec. 17, 1992 | [JP] | Japan | 4-337174 |
| Dec. 17, 1992 | [JP] | Japan | 4-355106 |

[51] Int. Cl.⁶ .............. F16C 32/06; H02H 7/00; H02H 7/08
[52] U.S. Cl. .............. 310/90; 310/67 R; 384/112
[58] Field of Search .............. 310/67 R, 90, 310/90.5; 384/112, 114

[56] References Cited

U.S. PATENT DOCUMENTS

| 4,200,344 | 4/1980 | Binns et al. | 308/9 |
| 4,726,693 | 2/1988 | Anderson et al. | 384/114 |
| 4,798,476 | 1/1989 | Sakatani et al. | 384/108 |
| 4,820,949 | 4/1989 | Mizobuchi et al. | 310/90 |
| 4,892,418 | 1/1990 | Asada et al. | 384/124 |
| 4,934,836 | 6/1990 | Tanaka et al. | 384/100 |
| 4,998,033 | 3/1991 | Hisabe et al. | 310/67 R |
| 5,046,863 | 9/1991 | Sakatani et al. | 384/101 |
| 5,067,528 | 11/1991 | Titcomb et al. | 141/4 |
| 5,103,335 | 4/1992 | Sugiura | 359/212 |
| 5,114,245 | 5/1992 | Tanaka et al. | 384/112 |
| 5,127,744 | 7/1992 | White et al. | 384/112 |
| 5,223,758 | 6/1993 | Kataoka et al. | 310/90 |
| 5,289,067 | 2/1994 | Tanaka et al. | 310/90.5 |
| 5,357,163 | 10/1994 | Minakuchi et al. | 310/90 |

*Primary Examiner*—Steven L. Stephan
*Assistant Examiner*—Michael Wallace, Jr.
*Attorney, Agent, or Firm*—McCormick, Paulding & Huber

[57] ABSTRACT

A motor having a bracket with a stator coil for generating a magnetic field and a rotor hub with rotor magnets for receiving a rotation force from the magnetic field generated by the coil. Upper and lower dynamic pressure radial bearings are formed in between the sleeve and the rotary shaft. The lower end surface of the rotary shaft is formed with a spiral groove in which a lubricating fluid is filled to form a dynamic pressure thrust bearing. The spiral groove is formed by a circular hole at the center of the shaft, and a plurality of curved grooves each curving from the circular hole to the direction opposite to the rotation direction of the shaft and gradually increasing its width toward the outer circumference of the lower end surface of the shaft without reaching the circumference. The spiral groove functions to move the lubricating fluid outward in the radial direction from the center of the shaft, when the shaft rotates.

15 Claims, 19 Drawing Sheets

5,559,382

SPINDLE MOTOR

BACKGROUND OF THE INVENTION a) Field of the Invention

The present invention relates to a spindle motor, and more particularly to a spindle motor using a dynamic pressure type bearing.

b) Description of the Related Art

A brushless multi-phase d.c. motor has been used for driving a magnetic disc. This type of motor is called a spindle motor having a stator with a stator coil for generating a magnetic field, and a rotor with rotor magnets for receiving a rotation force in cooperation with the magnetic field.

As disc drives are becoming more and more compact, there is a strong need for a compact spindle motor. In order to comply with such a need, a technique has been studied to use a dynamic pressure type bearing between a stator and a rotor of a spindle motor. An example of the dynamic pressure type bearing structure is disclosed, for example, in Japanese Patent Laid-open No. 3-60355. In this structure, herringbone shaped grooves are formed on the radial contact surface between the rotor and stator. The rotation of the rotor pressurizes a lubricating fluid filled in the grooves so that a force is generated to provide a space between the rotor and stator. This force functions as a radial direction bearing.

For a dynamic pressure type thrust direction bearing, a spiral groove is formed on the end surface of a shaft of the rotor. A pumping operation generated by the rotation of the shaft pressurizes the lubricating fluid to raise the shaft.

SUMMARY OF THE INVENTION

It is an object of the present invention to provide a spindle motor capable of improving the rigidity and stability of the bearing without increasing the number of components.

It is another object of the present invention to provide a spindle motor capable of minimizing a motion of a hub member supporting a disc in the rotary axis direction, the spindle motor having a relatively simple structure and a high reliability and productivity and being capable of facilitating an assembly and reducing the manufacturing cost.

It is a further object of the present invention to provide a spindle motor having a dynamic pressure type bearing capable of minimizing a motion of a shaft and a sleeve in the radial direction and axial direction, preventing drainage of a lubricating fluid from the dynamic pressure type bearing to thereby avoid deteriorated lubrication, short life time of the motor, and contamination of the environment.

According to one aspect of the present invention, there is provided a spindle motor having a stator having a stator coil for generating a magnetic field when excited, a rotor having rotor magnets for receiving a rotation force in corporation with the magnetic field generated by the stator coil, a first dynamic pressure bearing formed at the area where said stator and said rotor face each other, said area being filled with a lubricating material, and said first dynamic pressure bearing having a groove of a predetermined shape, and rotation direction controlling means for controlling the rotor to rotate in the direction that the lubricating material is pushed outward from the rotation center of the rotor by the rotation of the groove of the first dynamic pressure bearing.

Since the groove of the dynamic pressure bearing is formed such that the lubricating material is pushed outward from the rotation center of the rotor, the pressure at the area where the lubricating material was removed lowers. Therefore, a force of attracting the rotor shaft is generated, realizing a spindle motor having a large rigidity and stability of the bearing. In addition, the number of components can be reduced, and the structure can be simplified, facilitating an assembly and an injection of the lubricating material.

DETAILED DESCRIPTION OF THE PREFERRED EMBODIMENTS

Figure 1:
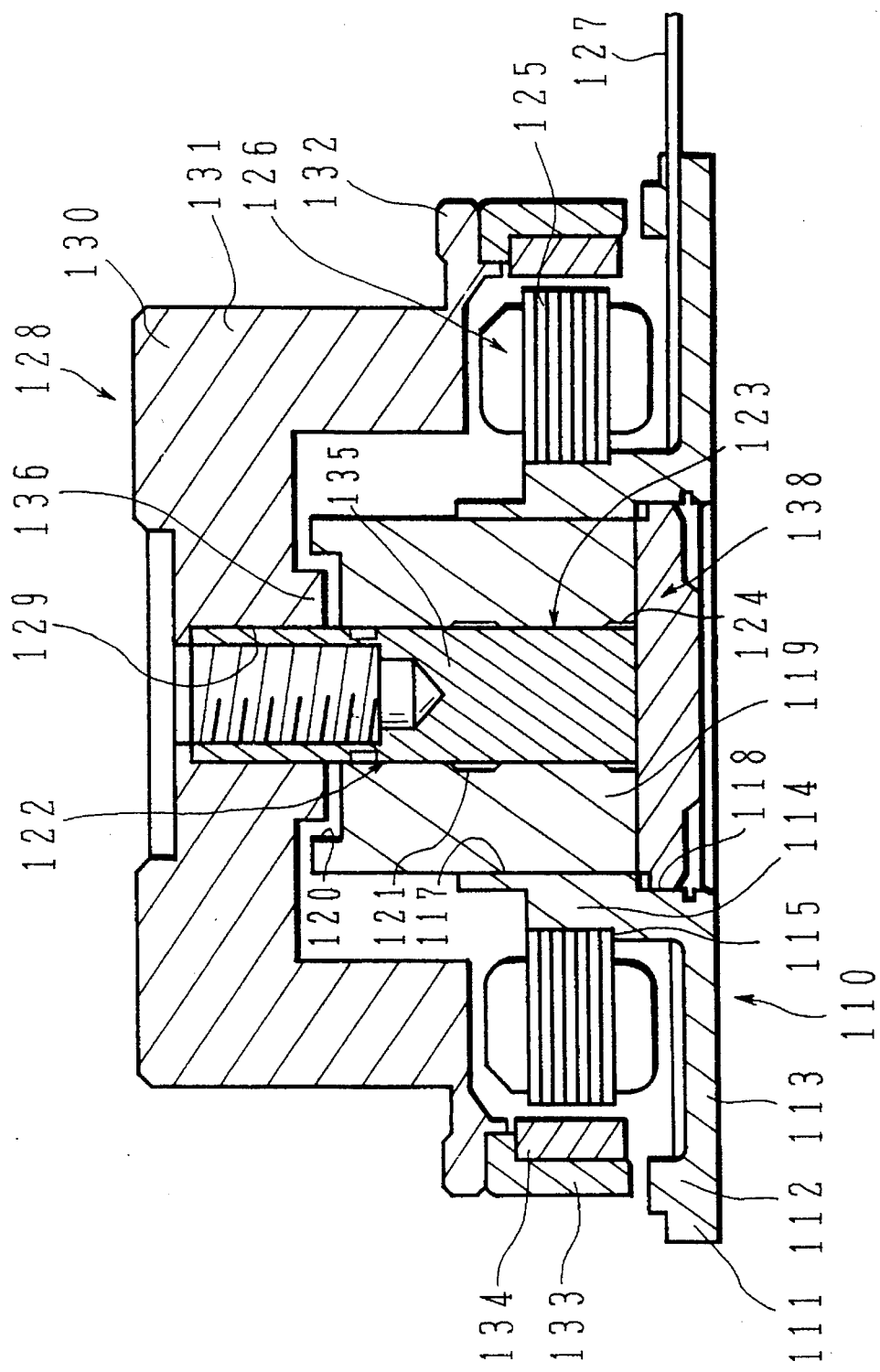
FIG. 1 is a sectional view of an embodiment of a spindle motor according to the present invention.
Figure 2:
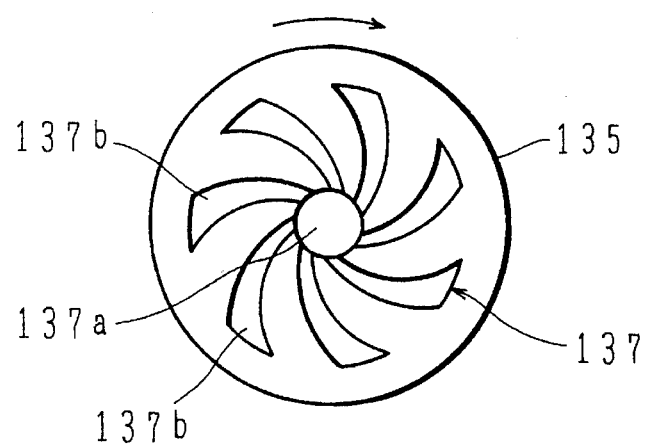
FIG. 2 is a bottom view of a rotary shaft of the spindle motor shown in FIG. 1.
Figure 3:
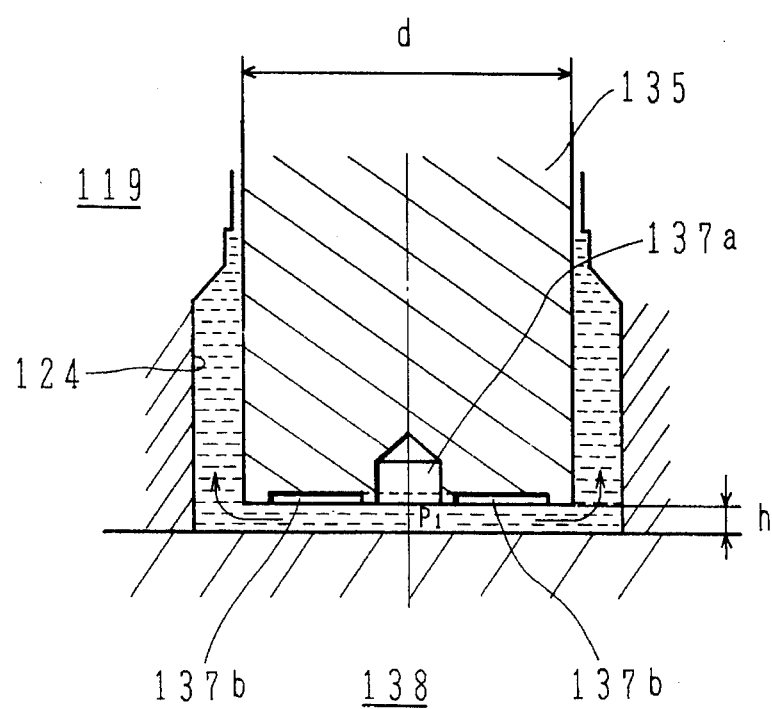
FIG. 3 is a detailed diagram explaining the operation of the dynamic pressure type thrust bearing of the spindle motor shown in FIG. 1.

Preferred embodiments of the present invention will be described with reference to the accompanying drawings. FIGS. 1 to 3 show an embodiment of the spindle motor according to the present invention. The spindle motor is a shaft rotation type brushless d.c. motor. The motor has a bracket (stator) 110 of generally an inverted T shape in section. The bracket 110 has an annular flange 111, an outer wall 112 upright at the inner circumferential area of the annular flange 111, an annular depression 113 formed on the surface of the flange 111 at the inner circumferential area of the outer wall 112, a tubular inner wall 114 integrally formed with the flange 111 at the inner circumferential area of the depression 113, and a step 115 formed on the outer surface of the inner wall 114.

A hole 117 of a circle in section is formed in the inner wall 114 of the bracket 110 over the full length of the inner wall 114. A large diameter section 118 is formed at the lower opening end of the hole 117. A sleeve 119 is inserted into the hole 117 and fixed in tight contact with the hole 117. The sleeve 119 is a hollow tube with both ends being opened. The upper end extends out of the hole 117 above the upper edge of the inner wall 114, and the lowest end faces the large diameter section 118 of the hole 117.

An annular recess 120 is formed on the upper end of the sleeve 119, and an annular groove 121 is formed on the inner circumferential surface at the middle height of the sleeve 119 to reservoir a lubricating fluid (for example, oil). Herringbone grooves (not shown) are formed on the inner circumferential surface of the sleeve 119 at the upper and lower positions than the annular groove 121. A lubricating fluid is filled in these herringbone grooves to form upper and lower radial bearings (dynamic pressure type radial bearings) 122 and 123.

The herringbone grooves 122 and 123 may be formed not on the inner circumferential surface of the sleeve 119 but on the outer circumferential surface of a rotary shaft to be described later. An annular recess 124 is formed on the lower end of the inner circumferential surface of the sleeve 119.

A stator core 125 is fixedly mounted positioning at the step 115 at the area outside of the inner wall 114 of the bracket 110. Three phase coils 126 are wound about the stator core 125. In this embodiment, as a means for supplying current to the stator coils 126, a flexible print wire board 127 is used which is bonded to the depression 113 of the bracket 110 and one end of the board extends out of the motor.

In FIG. 1, reference numeral 128 represents a rotor hub of generally an inverted cup. The rotor hub 128 has a base 130 with a coupling through hole 129 formed in the central area, an outer wall 131 extending downward from the base 130, and a ridge 132 extending outward from the outer wall 131. A plurality of hard discs are placed on the ridge 132 with spacers being inserted.

A rotor yoke 133 is fixed to the bottom surface of the ridge 132. Cylindrical rotor magnets 134 are fixed to the inner side of the rotor yoke 133, at the positions corresponding in height to the stator cores 125. A cylindrical rotary shaft 135 is inserted into and fixed to the coupling hole 129 of the rotor hub 128, concentrically with the hub 128. The base 130 has a thick section 136 extending downward from the bottom surface of the base 130. In the assembled state of the motor, the thick section 136 enters the recess 120 of the sleeve 119. The combination of the thick section 136 and the recess 120 forms a labyrinth seal.

A labyrinth seal is formed when a stationary member is disposed near a rotating member. The sealing capability can be improved by forming a groove or recess of a proper shape on the sleeve 119 of a stationary member or the thick section 136 of a rotating member. A lubricating oil exists between the stationary member and rotating member and is prevented from being leaked by the labyrinth seal effect.

As shown in FIG. 2, a spiral groove 137 is formed on the lower end of the rotary shaft 135. The dynamic pressure thrust bearing is formed by filing a lubricating oil in the spiral groove 137. The spiral groove 137 shown in FIG. 2 which is the bottom view of the rotary shaft 135 is formed by a circular hole 137a at the center of the rotary shaft 135 and a plurality of curved grooves 137b. Each curved groove 137b extends from the circular hole 137a, curves in the direction opposite to the rotation direction of the shaft 135, gradually increases its width as it goes toward the outer circumference but will not reach the outer circumference. As the shaft 135 rotates, the lubricating oil is pushed outward from the center of the shaft 185.

The spiral groove 137 may be formed on a thrust plate 138 to be described later. The rotary shaft 135 formed with the spiral groove 137 is inserted into the sleeve 119 after it is fixedly fitted in the rotor hub 128 and the lubricating oil is injected. Thereafter, the lubricating oil is again injected, and the thrust plate 138 is tightly fitted in and fixed to the larger diameter section 118 formed at the opening end portion of the hole 117 of the bracket 110. In this manner, the dynamic pressure thrust and radial bearings are sealed and the assembly of the motor is completed.

In the embodiment spindle motor constructed as above, the spiral groove 137 at the dynamic pressure thrust bearing is formed so as to push out the lubricating oil from the rotation center of the rotor shaft. The pressure at the area from which the lubricating oil was removed lowers, so that the rotor shaft 135 is attracted increasing the rigidity of the bearing.

This function will be detailed with reference to FIG. 3. In FIG. 3, a force $\pi d^2/4*(P_0-P_1)$ attracts the rotor shaft 135, where d represents the diameter of the shaft 135, h represents a gap between the lower end surface of the shaft 135 and the upper surface of the thrust plate 188, $P_0$ represents the atmospheric pressure, and $P_1$ represents an average pressure at the gap between the lower end surface of the shaft 135 and the upper surface of the thrust plate 138.

An oil film whose thickness has been regulated by the force pushing out the lubricant oil is formed between the flower end surface of the shaft 135 attracted by the attraction force and the upper surface of the thrust plate 138. This oil film supports the rotor shaft 135. The force $\pi d^2/4*(P_0-P_1)$ is applied while there is no displacement of the shaft in the axial direction. If there is a displacement in the axial direction, the force is further exerted from the oil film because of its viscosity and compression. With this force, the rigidity and stability of the bearing can be improved.

Consider now the case where a lubricating oil having a viscosity of 20 to 40 cP at the room temperature is injected in the gap between the rotor shaft 135 and the thrust plate 138, and the diameter d of the rotor shaft 135 is 3.5 mm and the weight of the rotor shaft with the magnetic discs is about 50 g. In this case, the gap h between the shaft 135 and the thrust plate 138 is 0 to 0.1 mm when the shaft 135 is not rotating, whereas the shaft 135 is attracted to the gap of about 0 to 2 μm when it is rotating.

Figure 4:
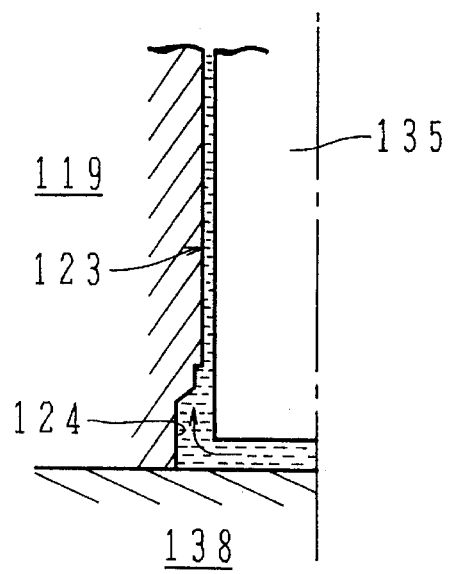
FIG. 4 is a cross section showing the main part of another embodiment of a spindle motor according to the present invention.
Figure 5:
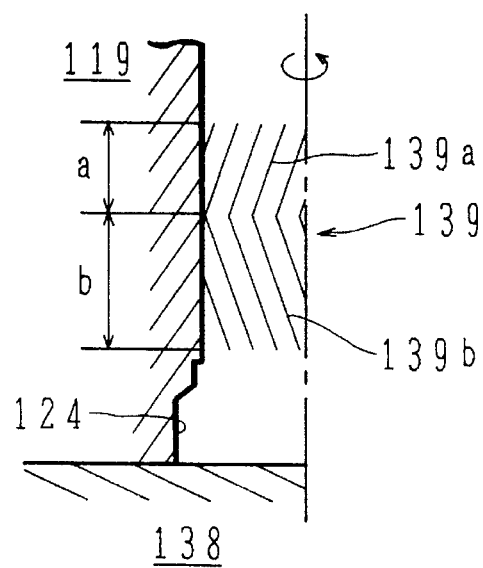
FIG. 5 is a diagram explaining the operation of the main part of embodiment shown in FIG. 4.

FIGS. 4 and 5 show the main part of another embodiment of the spindle motor according to the present invention. Like elements to those shown in FIG. 1 are represented by using identical reference numerals. Only the difference between the two embodiments will be described. In the embodiment shown in FIGS. 4 and 5, the lower radial bearing 123 is modified such that a plurality of herringbone grooves each being bent generally in a chevron pattern are formed on the inner surface of the sleeve 119.

Each chevron shaped groove is formed by an upper groove 139a having a length a from the deflection point to the upper distal end and a lower groove 139b having a length b from the deflection point to the lower distal end, the lengths being set as a<b.

With these modified herringbone grooves 139, during the rotation of the shaft 135, the dynamic pressure (moving the lubricating oil downward) exerted by the upper grooves 139a becomes less than that (moving the lubricating oil upward) exerted by the lower grooves 139b. In this case, the lubricating oil at the gap under the shaft 135 is pushed outward from the shaft center as indicated by an arrow in FIG. 4 by the dynamic pressure exerted by the lower grooves 139b, so that the shaft 135 is attracted downward like that shown in FIG. 3.

Therefore, this embodiment has the similar effects to those of the embodiment shown in FIG. 1. In this embodiment the herringbone grooves 139 can realize both the functions of the dynamic pressure radial bearing and the dynamic pressure thrust bearing, thereby lowering the manufacturing cost. The provision of both the herring bone grooves 139 and the spiral groove 137 at the lower end surface of the shaft 135 allows the shaft 135 to attract downward, and stabilizes the support of the shaft 135 of the spindle motor.

Although not shown in FIGS. 4 and 5, an O ring seal is provided at the upper portion of the upper dynamic pressure radial bearing in order to prevent the shaft 135 from being dismounted from the motor when it is stopped, and in order to prevent a leak of the lubricant oil. Also in this embodiment, the herringbone grooves 139 may be formed on the shaft 35 side, with the same advantageous effects.

Figure 5A:
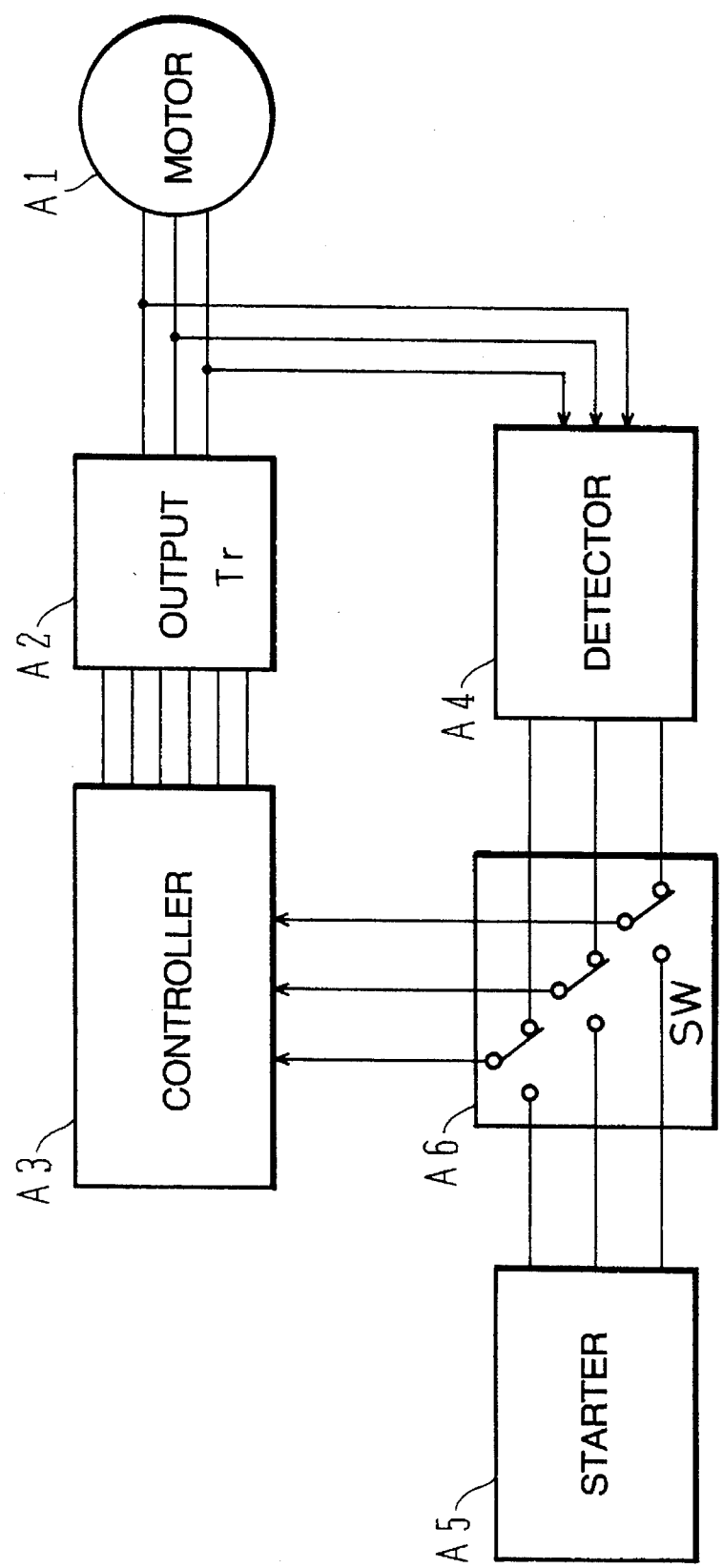
FIG. 5A is a spindle motor drive circuit in block.

FIG. 5A shows the drive circuit for a spindle motor, the drive circuit also providing a rotation direction control. As the motor rotates in the normal direction, the lubricating oil flows in a predetermined direction from the inner side to the outer side in the sleeve by means of the spiral grooves formed on the dynamic pressure bearing. However, if the motor rotates in the reverse direction, the flow in the predetermined direction will not occur and the dynamic pressure will not be generated. Namely, the spiral groove on the dynamic pressure bearing is formed so as to generate the dynamic pressure only when the motor rotates in the normal direction. It is therefore necessary for the drive circuit to rotate the motor in one direction to generate the dynamic pressure.

A detector A4 detects the coil electromotive forces generated by three-phase motor coils U, V and W of the motor A1, and detects the position of the rotor.

Detected coil electromotive force signals are supplied via switches A6 to a controller A3. The controller A3 detects the position of the rotor from the supplied signals, and controls output transistors A2 which supply phase voltages to the three-phase motor coils U, V and W, to thereby rotate the rotor in the predetermined direction.

The output transistors A2 supply phase voltages corresponding to the control signals from the controller A3 to the motor coils U, V and W of the motor A1 to continue rotating the motor A1 in the predetermined direction.

At the start of the motor A1, the detector A4 cannot detect the rotor position because the motor A1 is still and will not generate the coil electromotive forces. At the start of the motor A1, therefore, the switches A6 are connected to a starter A5 to supply signals from the starter A5 to the controller A3.

The starter A5 operates to forcibly energize the motor coils to start the motor A1. The energizing start sequence is independent from the positions of the stator and the rotor magnets. Therefore, in some cases the motor may rotate slightly in the reverse direction.

However, this rotation generates the electromotive forces which are detected by the detector A4 and supplied to the controller A3 via the switches A6 now connected to the detector A4 side. Thereafter, the motor continues rotating in the predetermined direction. The dynamic pressure is generated by the rotation of the motor in the normal direction both at the dynamic pressure thrust bearing and dynamic pressure radial bearing.

In the above embodiments, the shaft if the spindle motor has been stabilized by using the dynamic pressure bearing at the lower end surface of the shaft. Next, an example of using the dynamic pressure bearing at the lower end surface and base periphery of the shaft will be described.

Figure 6:
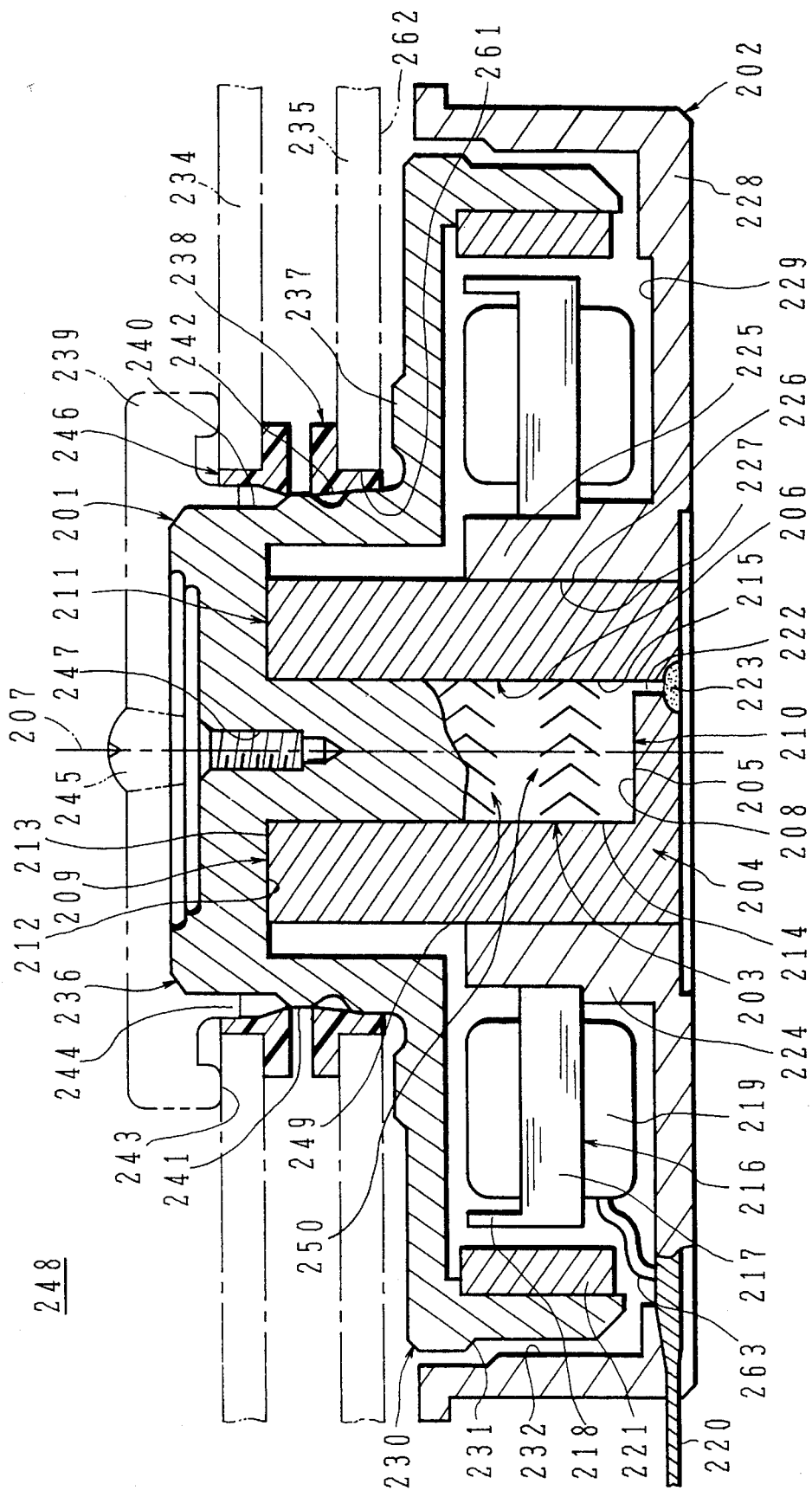
FIG. 6 is a cross section showing another embodiment of the spindle motor according to the present invention.

FIG. 6 is a cross section showing an embodiment of a spindle motor for rotating a magnetic disc for example. In FIG. 6, a hub 201 of an inverted cup shape is made of magnetic material such as stainless steel. The hub 201 has a smaller diameter section 236 at the upper portion and a larger diameter section 230 at the lower portion, integrally and concentrically formed. In this embodiment, two magnetic discs are mounted on the spindle motor. The lower magnetic disc 235 is placed on the larger diameter section 230 of the hub 201, and the upper magnetic disc 234 is fixed to the hub 201 by means of a clamp 239. Specifically, the magnetic disc 235 is fixed to the larger diameter section 230 with its lower surface contacting an annular projection 237 of the larger diameter section 230. The hole 261 of the disc is fixed to the smaller diameter section 236 of the hub 201 by a spacer 238 which is made of resilient resin. An engaging section 242 of the spacer 238 extending inward in the radical direction resiliently engages with an annular protection 241 formed on the outer circumference 240 of the smaller diameter section 236. The upper disc 234 is fixed to the hub 201 with its upper surface contacting an annular projection 243 of the clamp 239. The hole of the disc 234 is fixed to the smaller diameter section 236 via a spacer 246 which has the same configuration and material as the other space 238 described above. The spacer 246 resiliently engages with the annular projection 241 formed on the outer circumference 240 of the smaller diameter section 236, via a coupling section 244 of the clamp 239. As seen from FIG. 6, the magnetic discs 234 and 235 are fixedly and symmetrically mounted on the smaller diameter section 236 by the spacers 246 and 238. The clamp 239 is fixed to the hub 201 by a screw 245 threading into a female screw 247 formed in the hub 201 on the rotary axis 207. In this manner, the magnetic discs 234 and 235 can be mounted on the hub 201 at predetermined heights thereof because of the abutment to the annular projections 243 and 237 via the resin spacers 246 and 238. As a result, the magnetic discs 234 and 235 are not susceptible to strain stress to be caused by thermal expansion of the hub 201, being free oil warp and deformation.

The hub 201 is integrally formed with a shaft 203 depending therefrom along the rotary axis 207. A plurality of upper and lower herringbone grooves 249 and 250 are formed on the circumferential surface 214 of the shaft 203. The shaft 203 is held in a hole 206 of a sleeve 204 which is made of, for example, lead alloy. The sleeve 204 is fixed to a tubular section 225 of a housing 202 which is a stationary member. About one half of the outer surface 226 of the sleeve 204 is fitted tightly or bonded to the inner surface 227 of the tubular section 225. This arrangement is effective in reducing the substantial size of the smaller diameter section 236 of the hub 201 in the radial direction and in eliminating any distortion of the opening size of the hole 206 of the sleeve 204, because of the whole of the sleeve 204 is not fixed to the inner surface of the tubular section 224. The hole 206 of the sleeve 204 has an opening 209 and a bottom 208 and is cylindrical. The inner diameter of the hole 206 is slightly larger than the diameter of the shaft 203, allowing the latter to be fitted in the former. The bottom 208 is formed with a through hole 222 at the lower end of which there is formed an adhesive pool. A lubricating fluid (for example, oil) is filled in a fine gap between the shaft 203 and the hole 206 of the sleeve 204. The lubricating fluid exists therefore in the herringbone grooves 249 and 250 formed on the outer circumference 215 of the shaft 203 and in between the shaft 203 and the hole 206 of the sleeve 204. This forms a dynamic pressure radial bearing for rotatably supporting the shaft 203 about the rotary axis 207. The through hole 222 has a function of draining air when the shaft 203 is inserted into the hole 206 of the sleeve 204, and has a function of injecting the lubricating fluid to the hole 206 after the shaft 203 was inserted in the hole 206. After injection of the lubricating member, the through hole 222 is closed by an adhesive agent 223.

An armature assembly is mounted at the area outside of the tubular section 225 of the housing 202. A plurality of armatures 216 are disposed radially to constitute pole teeth as many as a predetermined number of poles. Each armature 216 is formed by a stator core 217 made of a predetermined number of magnetic steel plates and an armature coil 219 wound about the stator core 217. The armature 216 is fixedly mounted on a step 224 formed on the tubular section 225 of the housing 202. Coil lead wires 263 from the armature coil 219 are electrically connected to a flexible circuit board 220 attached to the bottom plate 228 of the housing 202. The flexible circuit board 220 extends from the housing 202 outside of the spindle motor. A rotor magnet 221 is mounted on the large diameter section 230 of the hub 201, facing the armature 216 outward in the radial direction. The rotor magnet 221 is formed by a predetermined number of magnets whose N and S poles are alternately disposed in the circumferential direction and bonded to a depending wall 233 of the larger diameter section 230. Accordingly, when an electric signal is applied to the flexible circuit board 220 and the armature coil 219 is powered, the hub 201 rotates relative to the housing 202 by the magnetic interaction between the armature 216 and rotor magnet 221. In this example, the hub 201 rotates relative 4o the housing 202 in the clockwise direction. The stator core 217 of the armature 216 has an upward projection 218 which serves to flush the magnetic centers of the armature 216 and rotor magnets 221. The armature 216 is positioned lower than the rotor magnet 221 in the rotary axis 217 direction to mount the armature 216 on the housing 202 as low as possible and to reduce the height of the spindle motor. In order to prevent the bottom of the armature 216 from becoming in contact with the bottom plate 228 of the housing 202, a depression 229 is formed at the region corresponding to the armature coil 219.

Figure 7A:
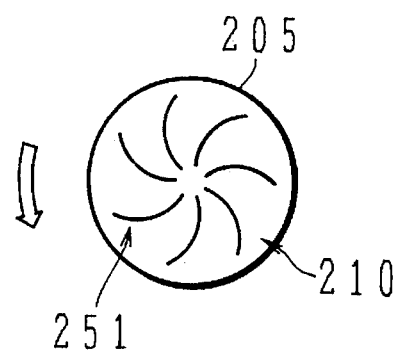
FIGS. 7A and 7B are plan views illustrating parts of the spindle motor shown in FIG. 6.
Figure 7B:
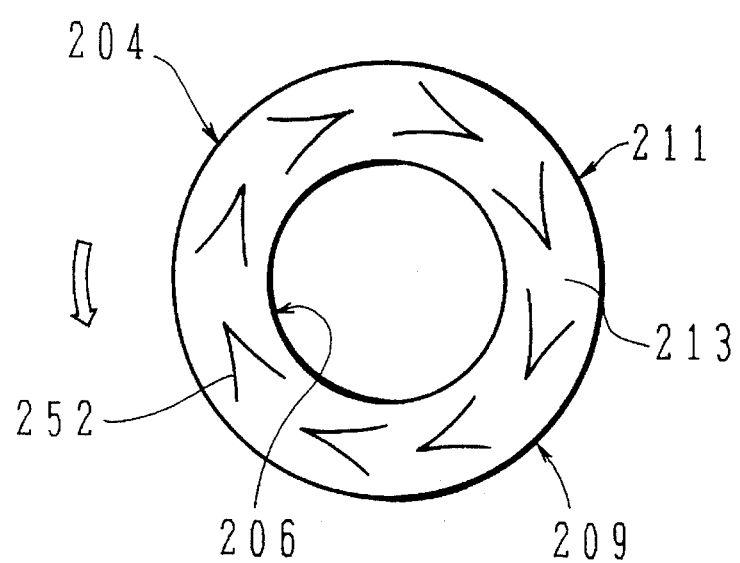

The lower end surface 205 of the shaft 203 is formed with a spiral groove 251 such as shown in FIG. 7A showing the bottom view of the lower end surface 205. A lubricating member is filled in a fine gap between the spiral groove 251 of the shaft 203 and the bottom 208 of the sleeve 204, forming a dynamic pressure thrust bearing (first dynamic pressure thrust bearing). As the shaft 203 (or hub 201) rotates in the direction indicated by an arrow in FIG. 7A, there is exerted a dynamic pressure which attracts the shaft 203 toward the bottom 208. The base periphery 213 of the sleeve 204 at the opening 209 is also formed with a spiral groove 252 such as shown in FIG. 7B showing the bottom view of the base periphery 213. A lubricating member is filled in a fine gap between the base periphery 213 and the hub 201 at the area 212 corresponding to the base periphery 213, forming a dynamic pressure thrust bearing (second dynamic pressure thrust bearing). As the shaft 203 rotates in the direction indicated by an arrow in FIG. 7A, the relative rotation of the stationary sleeve 204 is in the direction indicated by an arrow in FIG. 7B. As the shaft 203 rotates, there is exerted a dynamic pressure which lifts the hub 201 from the sleeve 204. With the first and second dynamic pressure bearings 210 and 211, the hub 201 equilibrates at a predefined height in the rotary axis 207 direction relative to the stationary housing 202. Because the dynamic pressure exerted by the second dynamic pressure thrust bearing 211 is greater than that by the first dynamic pressure thrust bearing 210 (due to the larger effective area of the spiral groove 52 than the groove 51 as seen from FIGS. 7A and 7B), the hub 201 is maintained at the predefined position while supporting its weight and the weights of the magnetic discs 234 and 235. In the spindle motor of this embodiment, the dynamic pressures to be exerted by the first and second dynamic pressure thrust bearings are different (the dynamic pressure by the second bearing is greater than the first bearing), and the height of the hub 201 can be maintained at the predefined position. During the rotation of the hub 201, the dynamic pressures of the first and second bearings can be equilibrated, minimizing a change in height stably. Even the spindle motor is operated by turning it upside down, the hub 201 is hard to be dismounted from the sleeve 204 (or housing 202) because the shaft 203 is hermetically sealed by the sleeve 204. It is therefore unnecessary for the spindle motor to provide a conventional position regulator which regulates-the position in the rotary axis direction. Moreover, the structure is simple, facilitating the working and assembly. The lower end surface 205 of the shaft 203 has a tip at the center thereof so that the hub 201 contacts the bottom 208 at one point while the hub 201 (shaft 203) is not rotating. The spiral groove 251 formed on the lower end surface 205 of the shaft 203 will not contact the bottom 208 at the initial stage of rotation and at the halt of rotation, avoiding any damage by abrasion and improving the durability. There is a gap at the halt of rotation between-the base periphery 213 and the corresponding surface 212 of the hub 201. As a result, the spiral groove 252 not always contacts the corresponding surface 212, avoiding any damage by abrasion. The lubricating member filled between the shaft 203 and sleeve 204 hardly leaks. Even if the lubricating member leaks from the opening 209 of the sleeve 204, it is contained within the spindle motor because of the saucer shape of the housing 202. The lubricating member will not be leaked to the disc space 248 because of the labyrinth structure constituted by the outer wall 232 of the housing 202 and the depending wall 231 of the larger diameter section 230 of the hub 201.

In order to make the dynamic pressure of the second dynamic thrust bearing 211 greater than the first dynamic pressure thrust bearing 210, the effective area of the spiral groove 252 of the second bearing 211 is made larger than that of the first bearing 210. The dynamic pressure can be increased, for example, by increasing the number of grooves or by forming grooves nearer to the circumference. A taper surface may be formed at the tip formed on the lower end surface 205 of the shaft 203. In this case, the dynamic pressure becomes greater the more the angle of the taper surface is made smaller relative to the surface of the bottom 208.

Figure 8:
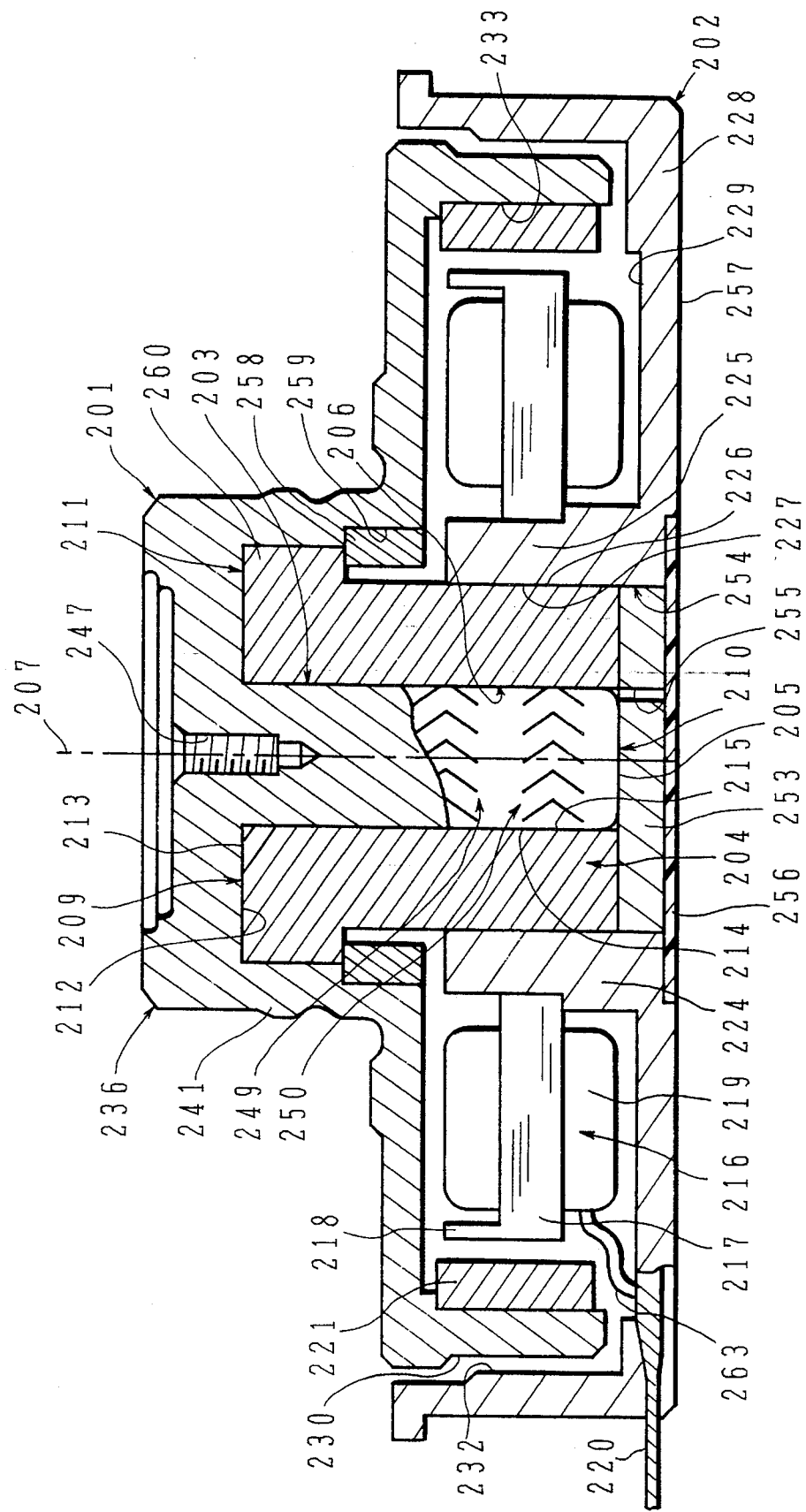
FIG. 8 is a cross section showing another embodiment of the spindle motor according to the present invention.

FIG. 8 is a cross section showing another embodiment of the spindle motor according to the present invention. Like elements to those shown in FIG. 6 are represented by identical reference numerals. The structure of this embodiment is generally the same as the embodiment shown in FIG. 6, and only the different points will be described in the following. In FIG. 8, a through hole 206 is formed in a sleeve 204, and the bottom of the hole 206 is closed by a thrust plate 253 which is formed with a through hole 255. A seal member 256 is attached to the bottom surface 257 of a housing 202 to enclose an outer space communicating with the through hole 255. An angular member 258 bonded to the inner circumference 259 of a hub 201 engages with the lower surface of a shoulder 260 of the sleeve 204. The angular member 258 prevents the hub 201 From being dismounted from the sleeve 204 even if the spindle motor is turned upside down. In the assembly of the spindle motor of this embodiment, the shaft 203 is first inserted into the sleeve 204, then the angular member 258 is bonded to the hub 201. A lubricating member is injected into the hole 206 of the sleeve 204. In injecting the lubricating memory, the spindle motor is turned upside down. With this posture, the hub 201 is likely to be dismounted from the sleeve 204 because of the through hole 206. However, the provision of the annular member 258 engaging with the sleeve 204, the hub 201 can be prevented from being dismounted from the sleeve 204. Obviously, this annular member 258 is also effective for preventing the dismount of the hub 201 during the normal rotation or handling. The lubricating member is injected to the hole 206 of the sleeve 204 to fill a predetermined amount to a fine gap between the inner circumference 215 of the hole 206 and the outer circumference 214 of the shaft 203. Next, the thrust plate 253 is inserted into a hole 254 of a tubular section 225 of a housing 202. In this assembly, air bubbles are likely to be left in the filled lubricating member. Air bubbles may expand by a temperature rise during the rotation of the spindle motor so that the lubricating member is pushed out from a passage 209 at the upper end surface of the sleeve 204. However, such air bubbles can be removed via the through hole 255 formed in the thrust plate 253, preventing the leak of the lubricating member. Like the embodiment shown in FIG. 6, this embodiment has both the first and second dynamic pressure thrust bearings 210 and 211 of the same structure. With the first and second dynamic thrust bearings 210 and 211, the dynamic pressures are equilibrated to hold the shaft 203 at the predefined position in the rotary axis 207 direction, providing the same advantageous effects and operations.

The spindle motor of the embodiment shown in FIG. 6 has the herringbone grooves 249 and 250 formed on the outer circumference 214 of the shaft 203 as the dynamic pressure bearing. Instead of the shaft 203, the herringbone grooves 249 and 250 may be formed on the inner circumference 215 of the hole 206 of the sleeve 204. Also, although the spiral groove 251 is formed on the lower end surface 205 of the shaft 203 as the first dynamic pressure thrust bearing 210, it may be formed on the surface of the bottom 208. Similarly, for the second dynamic pressure thrust bearing 211, the spiral groove 252 may be formed on the corresponding surface 212 of the hub 201 instead of the base periphery 213 of the sleeve 204. These modifications are also applicable to the spindle motor shown in FIG. 8. In both the embodiments shown in FIGS. 6 and 8, the shape and number of grooves for exerting the dynamic pressure may be designed and set as desired. The effective area of grooves may be changed depending upon the number of magnetic discs and the direction of center of weight.

Use of the above-described dynamic pressure thrust bearing can dispense with a conventional position regulator such as a collar, reducing the number of components such as a thrust plate and simplifying the structure to thereby facilitating the working and assembly of the spindle motor and reducing the manufacturing cost. Moreover, a change in position of the shaft in the rotary axis direction can be minimized with a simple structure, realizing a spindle motor of a high reliability and productivity.

Next, another embodiment of the spindle motor will be described wherein a change in position of the rotor can be minimized in both the radial and axial directions and a lubricating member at the dynamic pressure bearing can be prevented from being leaked.

Figure 9:
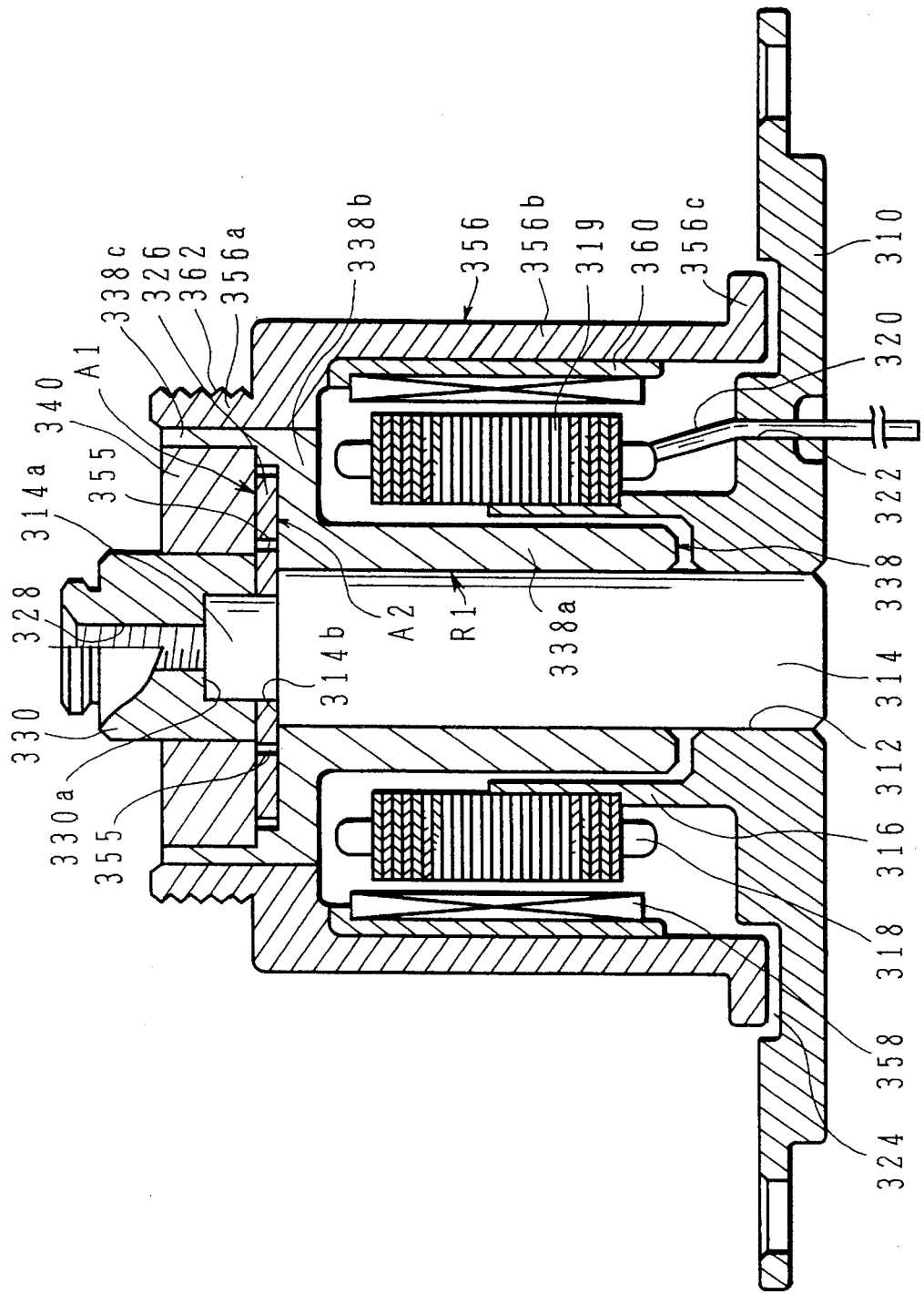
FIG. 9 is a cross section showing a further embodiment of the spindle motor according to the present invention.
Figure 10:
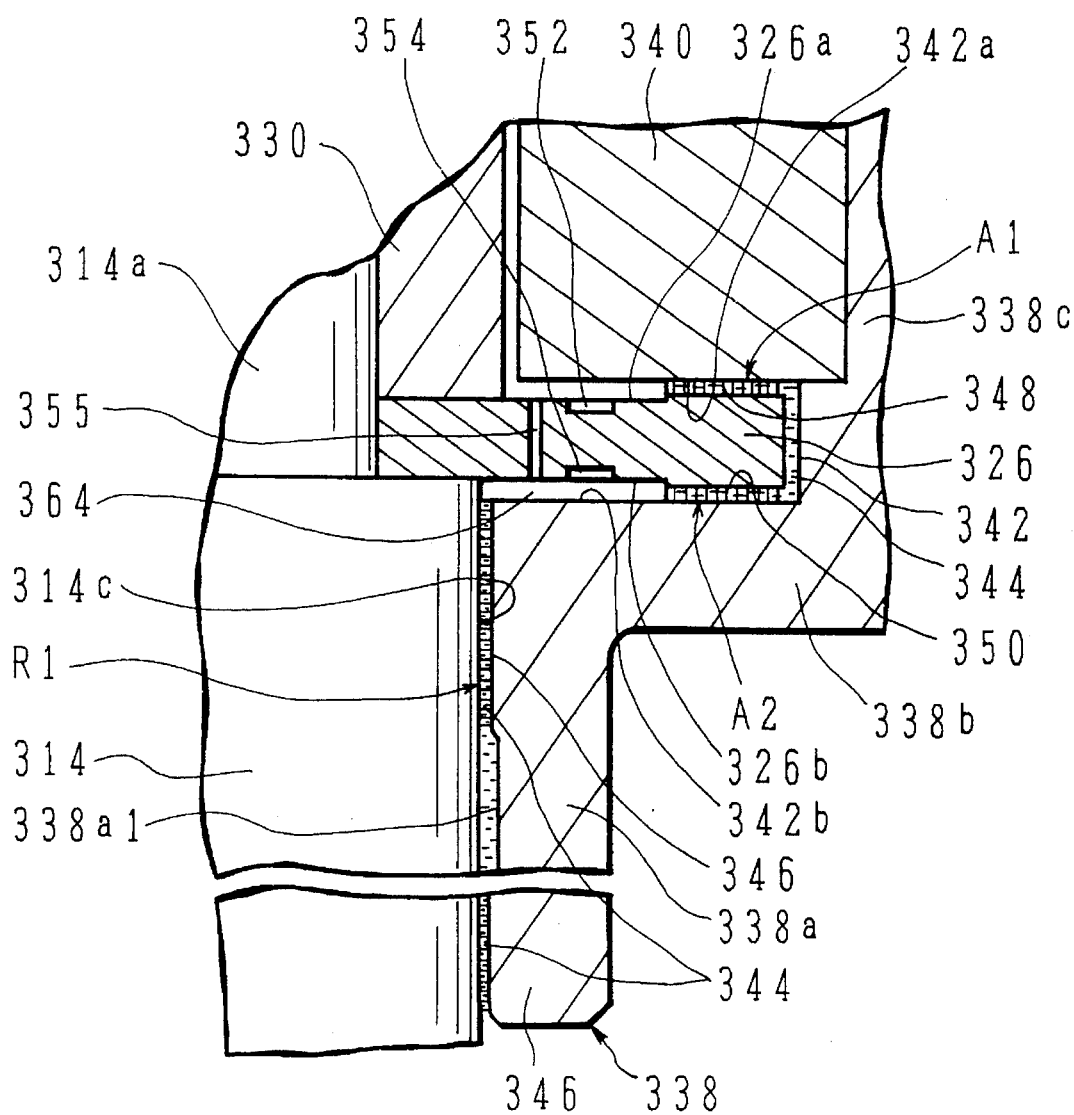
FIG. 10 is a schematic enlarged view partially showing the spindle motor of FIG. 9.

FIG. 9 is a cross section showing an embodiment of the spindle motor with a fixed shaft, and FIG. 10 is a schematic enlarged view showing the main part of the spindle motor shown in FIG. 9.

A fixed cylindrical pole 314 is mounted upright with its lower end portion being fixedly inserted into a hole 312 formed in a bracket 310 at the central area thereof. A tubular section 316 is integrally formed with the bracket 310 at the outside of the hole 312 in the radial direction. At the outside of the tubular section 316 in the radial direction, there is fixedly mounted a stator core 319 with a stator coil 318 being wound thereabout. Lead wires 320 of the stator coil 318 extend downward from the bracket 310 via an output port 322. An annular depression 324 is formed on the surface of the bracket at the outside of the tubular section 316 in the radial direction.

A disk type thrust plate 326 is fixed to the outer circumference of a smaller diameter section 314a of the fixed pole 314. A fixed bush 330 of generally a cylindrical shape has a thread groove formed on the inner surface of a screw hole 328 and a recess 330a formed at the lower center area of the bush 330. The bush 330 is fixedly mounted on the smaller diameter section 314a by using the recess 330a, with the thrust plate 326 being sandwiched between an annular upper surface of the fixed pole 314 and the bush 330. Upper and lower annular surfaces 326a and 326b of the thrust plate 326 extending in the radial direction are perpendicular to the circumferential surface 314c of the fixed cylindrical pole 314. In this embodiment, the fixed pole 314, thrust plate 326, and fixed bush 330 constitute a stationary shaft.

A sleeve 338 is formed by a smaller diameter sleeve section 338a with an inner circumference 338a1, a rib section 338b extending outward from the upper portion of the sleeve section 338a in the radial direction, and a larger diameter section 338c extending upward from the outer periphery of the rib section 338b. The sleeve section 338a is mounted on the outer circumference of the fixed pole 314. An annular rotary bush 340 is inserted into the space defined by the rib section 338b and fixed to the larger diameter section 338c, with a small gap to the outer circumference of the fixed bush 330. The thrust plate 326 is positioned in an annular recess 342 defined by the sleeve 338 and the rotary bush 340. In this embodiment, the assembly of the sleeve 338 and rotary bush 340 freely rotates about the stationary shaft by means of a lubricating member (fluid) 344 such as lubricating oil.

A dynamic pressure radial bearing R1 is formed in between the inner circumference 338a1 (radially movable part) of the sleeve section 338a and the corresponding surface (radially stationary part) of the outer circumference 314c of the fixed pole 314. Herringbone grooves 346 are formed on the inner circumference 338a1 of the sleeve section 338 at the lower and upper areas. The herringbone grooves 346 apply a high pressure to the lubricating member 344 filled in the gap between the sleeve section 338a and the outer circumference 314c of the fixed pole 314 when the sleeve 338 rotates in the normal direction. The herringbone grooves 346 may be formed on the outer circumference 314c of the fixed pole 314. Other grooves of any shape may be used in place of the herringbone grooves 346.

Dynamic pressure axial bearings A1 and A2 are formed in between the upper and lower annular surfaces 326a and 326 (axially movable part) of the thrust plate 326 and the upper and lower annular surfaces 342a and 242b (axially stationary part) defining the annular recess 342. These surfaces 326a and 326 are in parallel to the surfaces 342a and 342b respectively, with a small gap of about 12 μm for example being formed in the axial direction. Spiral grooves 348 and 350 are formed on the upper and lower annular surfaces 326a and 326b of the thrust plate 326 over the entire circumferential area at the outer area in the radial direction. The spiral grooves 348 and 350 apply a dynamic pressure to the lubricating member 344 filled in the gap between the upper and lower annular surfaces 326a and 326b and the upper and lower annular surfaces 342a and 342b when the sleeve 338 and rotary bush 340 rotate in the normal direction. The spiral grooves may be formed on the upper and lower annular surfaces 342a and 342b defining the annular recess 342. Other grooves of any desired shape may be used in place of the spiral grooves.

Annular recesses 352 and 354 are formed on the upper and lower annular surfaces 326a and 326b of the thrust plate 326 at the inside of the spiral grooves 348 and 350 in the radial direction. The inner surfaces of the annular recesses 352 and 354 have an obtuse angle relative to the lubricating member 344, so as the lubricating member 344 not to enter the annular recesses 352 and 354.

Figure 10A:
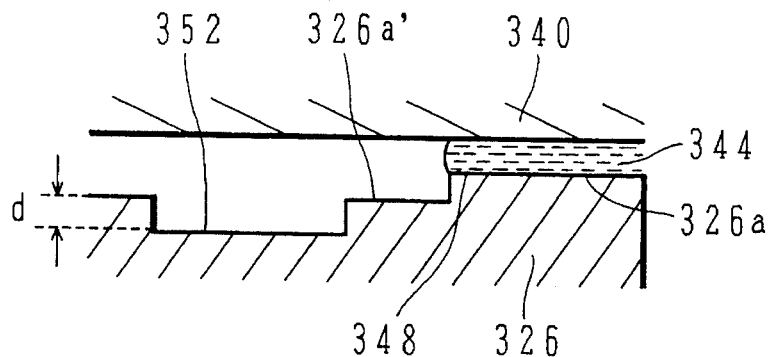
FIGS. 10A to 10D are cross sections showing the flow of lubricating oil in a space between a rotary bush and a thrust plate.

FIG. 10A illustrates the contour of the lubricating member 344 in the gap between the rotary bush 340 and thrust plate 326 during the rotation of the spindle motor. As the rotary bush 340 rotates relative to the thrust plate 326 fixed to the fixed pole 314, the lubricating fluid 344 flows outward in the radial direction by the operation of the spiral grooves 348 formed on the thrust plate 326. Therefore, the lubricating fluid 344 on the upper annular surface 326a' flows toward the area above the upper annular surface 326a. Therefore, most of the lubricating fluid 344 moves away from the upper annular surface 326a' and stays at the area between the upper annular surface area 326a and the rotary bush 340.

Figure 10B:
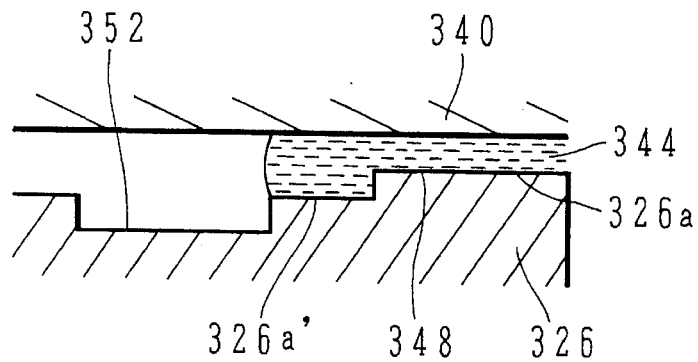

FIG. 10B shows the contour of the lubricating fluid 344 between the rotary bush 340 and thrust plate 326 at the halt of rotation. At the halt of rotation, any dynamic pressure in the radial direction will not be applied to the lubricating fluid 344 between the rotary bush 340 and thrust plate 326. Therefore, the lubricating fluid 344 on the upper annular surface 326a during the rotation is moved inward in the radial direction at the halt of rotation. The lubricating fluid 344 on the upper angular surface 326a flows to the area above the upper annular surface 326a' and stops at the interface between the annular recess 352 and the upper annular surface 326a' because of the surface tension of the lubricating fluid 344 having a rounded surface at the interface. In this case, the flow of the lubricating fluid 344 is more easily stopped by a lubricating fluid 344 repulsive agent which is coated on the inner surface of the rotary bush 340, upper and lower annular surfaces 326a and 326b of the thrust plate, and the surface of the annular recesses 352 and 354, applying the repulsion force to the lubricating fluid 344.

Even if the lubricating fluid 344 flows inward in the radial direction by overcoming the surface tension, it is reservoired in the annular recess 352 preventing it from moving further inward in the axial direction.

Figure 10C:
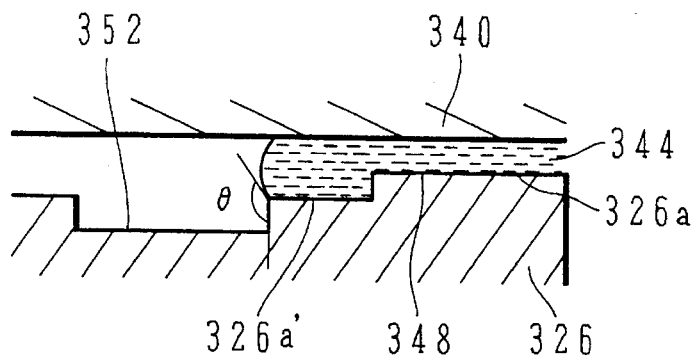

FIG. 10C illustrates the contact angle θ between the inner surface of the annular recess 352 and the surface of the lubricating fluid 344. The lubricating fluid 844 on the upper annular surfaces 326a' and 326a of the thrust plate 326 between the rotary bush 340 and the thrust plate 326 is rounded at the interface to the annular recess 352 because of the surface tension. The contact angle θ between the rounded surface of the lubricating fluid 344 and the inner surface of the annular recess 352 is an obtuse angle. The larger the contact angle θ, the surface tension of the lubricating member becomes greater, increasing the force of stopping the flow of the lubricating member.

Figure 10D:
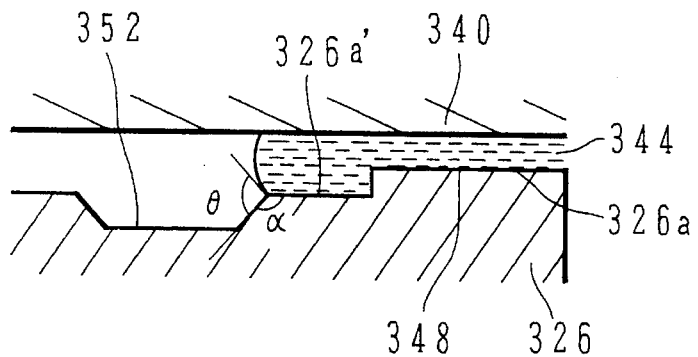

FIG. 10D illustrates the contact angle θ with a modified shape of the annular recess 352. The surface of the lubricating fluid 344 between the rotary bush 340 and the thrust plate 326 is rounded at the interface between the upper annular surface 326a' of the thrust plate 326 and the annular recess 352, similar to the case shown in FIG. 10C. The angle between the inner surface of the annular recess 352 and the upper annular surface 326a' is not required to be set to 90 degrees. However, the contact angle θ is required to be set to as abtuse angle.

It is preferable to set the step d between the upper angular surface 326a' and the annular recess 352 deeper than 0.2 mm in order to positively use the surface tension. In order to ensure the step depth at least 0.1 mm, the design of the depth may be set to 0.2 mm or more although it depends on the working technique. The deeper the step of the annular recess 352, the more the lubricating fluid 344 is prevented from flowing inward in the radial direction, because the annular recess 352 functions as the reservoir of the lubricating fluid 344.

The above explanation has been directed to the upper annular surface of the thrust plate 326. With respect to the lower annular surface 326b of the thrust plate 326, the lubricating fluid 344 can be prevented from flowing inward of the annular recess 354. The lubricating fluid 344 repulsive agent is also coated on the lower surface of the thrust plate 326 and the lower annular surface 342b defining the annular recess 342, as described previously.

As shown in FIG. 10, a plurality of through holes 355 are formed in the thrust plate 326 on a circumference inward from the annular recesses 352 and 354 at an equal radial angle pitch. The through holes 355 may be formed on the circumference at random positions.

A rotor hub 356 has generally a tubular shape, and is formed by a base 356a at the upper end portion, a circumferential wall depending from the base 356a and having a larger diameter, and an extension 356c extending outward from the lower end of the rotor hub 356. The rotor hub 356 is tightly fitted at its base 356a around the larger diameter section 338c of the sleeve 338. The rotor hub 356 and the sleeve 338 may be formed integrally. A tubular rotor yoke 360 is fitted in the circumferential wall 356b, the rotor yoke 360 having rotor magnets 358 mounted on the inner circumference of the rotor yoke 360. The rotor magnet 358 faces the stator core 319 and is spaced apart therefrom in the radial direction. A male screw 362 is formed at the outer periphery of the base 356a. A clamper (not shown) is fastened to the male screw 362 for squeezing and holding a recording media such as a hard disc mounted outside of the circumferential wall 356b, between the extension 356c and the clamper. The extension 356c is positioned in an annular depression 324.

The dynamic pressure radial bearing R1 can minimize a change in radial position of the sleeve 338 relative to the fixed pole 314 while it is rotating. The dynamic pressure axial bearings A1 and A2 can minimize a change in axial position of the sleeve 338 relative to the fixed pole 314 while it is rotating.

The dynamic pressures generated by the spiral grooves 348 and 350 of the upper and lower dynamic pressure bearings A1 and A2 cause the lubricating fluid 344 to flow in the radial direction. The dynamic pressures equilibrate at the surface of the thrust plate 326. Therefore, the lubricating fluid 344 normally stays at the dynamic pressure axial bearings A1 and A2 and at the outer circumference of the thrust plate 326.

The lubricating fluid 344 may tend to flow inward in the radial direction because of an imbalance of the dynamic pressures at the bearings A1 and A2 to be caused by some reasons, or because of thermal expansion of the lubricating fluid 344 or air in an air pool 364 between the bearing R1 and the bearings A1 and A2. The lubricating fluid 344 flowing inward is reservoired in the annular recesses 352 and 354 on the annular surfaces 326a and 326b of the thrust plate 326. Since the contact angle between the inner suffice of the annular recesses 352 and 354 and the contour of the lubricating fluid 344 is obtuse, it is possible to prevent the lubricating member 344 from flowing out of the recesses 352 and 354, reservoiring it in the recesses 352 and 354. It is therefore possible to prevent the lubricating fluid 344 from flowing out of the dynamic pressure axial bearings A1 and A2 and the lubrication from being deteriorated, and to prevent the lubricating fluid 344 from dispersing from the spindle motor.

Even if air in the air pool 364 likely to be produced at between the bearing R1 and the bearings A1 and A2 expands by a temperature rise, the pressures at the areas inward the recesses 352 and 354 are made equal by the through holes 355. Therefore, the lubricating fluid 344 will not flow to the area inward the upper dynamic pressure axial bearing A1 located upward. It is therefore possible to prevent the lubricating fluid 344 from flowing out of the dynamic pressure axial bearings A1 and A2 and the lubrication from being deteriorated, and to prevent the lubricating member from dispersing from the spindle motor.

Figure 11:
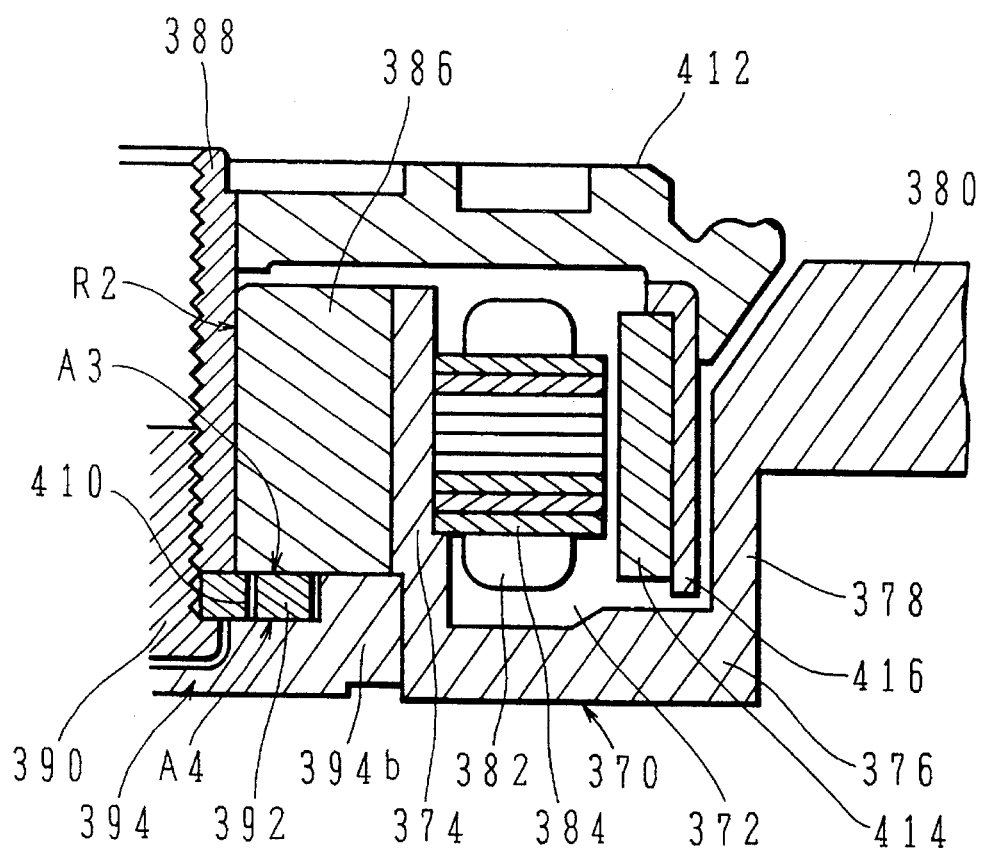
FIG. 11 is a cross section partially showing another embodiment of the spindle motor according to the present invention.
Figure 12:
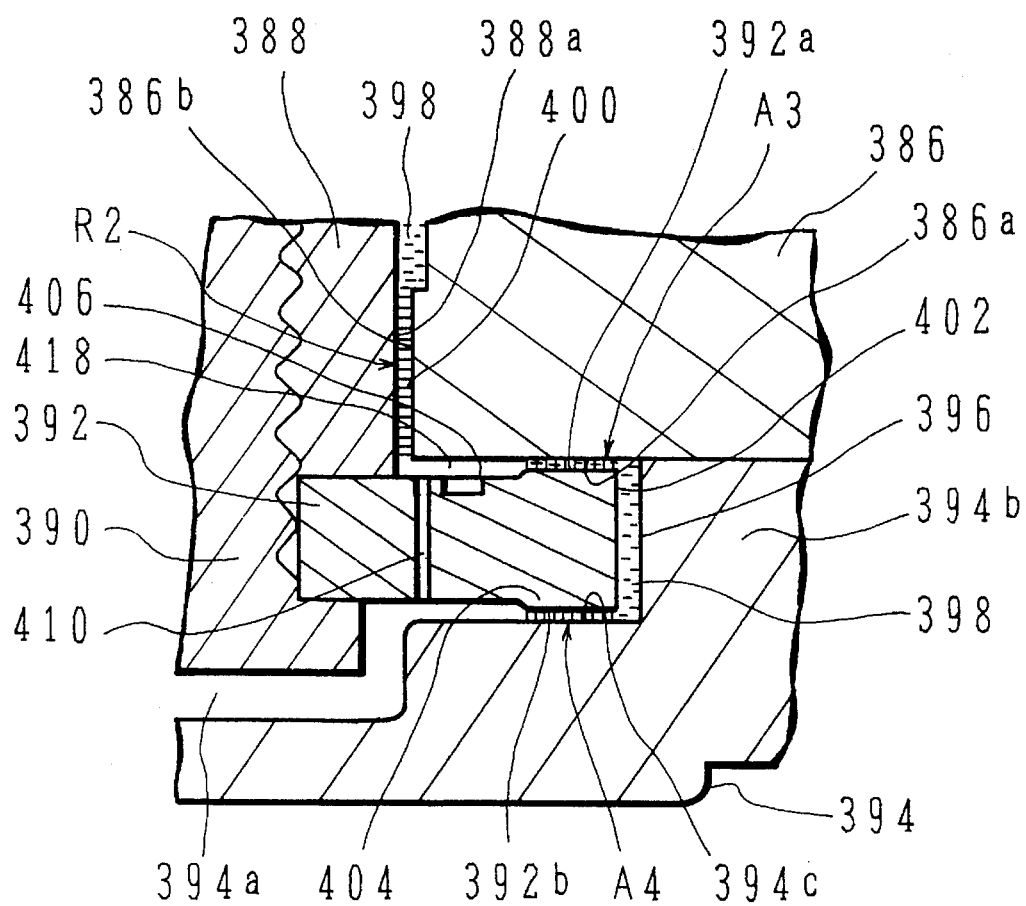
FIG. 12 is a schematic enlarged view showing part of the spindle motor of FIG. 11.

FIG. 11 is a cross section partially showing another embodiment of the spindle motor of a shaft rotating type according to the present invention, and FIG. 12 is a schematic enlarged diagram showing the main part of the spindle motor shown in FIG. 11.

A bracket 370 has an inner wall 374, a bottom plate 376 with an annular depression 372, an outer wall 378, and an annular extension 380 extending outward from the upper end potion of the outer wall 378. A stator core 384 with a stator coil 382 wound thereabout is fixed to the outer circumference of the inner wall 374. A tubular sleeve 386 is fitted in and fixed to the outer circumference of the inner wall 374. The bracket 370 and the sleeve 386 may be formed integrally.

A tubular rotary shaft 388 is inserted in the sleeve 386. A screw 390 is fastened to the shaft 388 at its lower end portion. An annular thrust plate 392 is fixed between the lower end of the shaft 388 and the head of the screw 390. The upper and lower annular surfaces 392a and 392b of the thrust plate 392 at the area outward in the radial direction are perpendicular to an outer circumference 388a of the shaft 388. In this embodiment, the shaft 388, thrust plate 392, and screw 390 constitute a shaft member.

A fixed bush 394 of a deep saucer shape is inserted at the lower end portion of the inner wall 374 of the bracket 370. The bush 394 is formed with a circular recess 394a at the central area thereof to accommodate the held of the screw 390 with some gap therebetween. The upper end of the outer wall 394b of the bush 394 is in tight contact with the lower end of the sleeve 386. The outer wall 394b is formed with an intermediate annular step surface 394c. The thrust plate 392 is interposed between this step surface 394c and the lower end surface 386a of the sleeve 386. Therefore, the sleeve 386 and the fixed bush 394 define an annular recess 396 opening inward in the radial direction. The thrust plate 396 enters in this annular recess 396. In this embodiment, a sleeve member constituted by the sleeve 386 and the fixed bush 394 freely rotates relative to the shaft member by means of the lubricating fluid 398.

A dynamic pressure radial bearing R2 is formed in between the inner circumference 386b (radially movable part) of the sleeve 386 and the corresponding outer circumference 388a (radially stationary part) of the shaft 388. Herringbone grooves 400 are formed on the inner circumference 386b of the sleeve 386 at the lower and upper positions. The herringbone grooves 400 apply a high pressure to the lubricating member 398 filled in the gap between the sleeve 386 and the outer circumference 388a of the shaft 388 when the sleeve 388 rotates in the normal direction. The herringbone grooves may be formed on the outer circumference 388a of the rotary shaft 388a. Other grooves of any shape may be used in place of the herringbone grooves.

Dynamic pressure axial bearings A3 and A4 are formed in between the upper and lower annular surfaces 392a and 392b (axially stationary part) of the thrust plate 392 and the upper and lower annular surfaces (lower end inward surface and annular intermediate step surface) 386a and 394c (axially movable part) defining the annular recess 396. These surfaces 392a and 392b are in parallel to the surfaces 386a and 394c respectively, with a small gap of about 12 μm for example being formed in the axial direction. Spiral grooves 402 and 404 are formed on the upper and lower annular surfaces 392a and 392b of the thrust plate 392 over the radially outer circumferential area thereof. The spiral grooves 402 and 404 apply a dynamic pressure to the lubricating fluid 398 filled in the gap between the upper and lower annular surfaces 386a and 394c and the upper and lower annular surfaces 392a and 392b when the sleeve 386 rotates in the normal direction. The spiral grooves 402 and 404 may be formed on the upper and lower annular surfaces 386a and 386b defining the annular recess 396. Other grooves of any desired shape may be used in place of the spiral grooves.

An annular recess 406 is formed on the upper and lower annular surfaces 392a and 392b of the thrust plate 392 at the inside of the spiral grooves 402 and 404 in the radial direction. The inner surface of the annular recess 406 has an obtuse angle relative to the lubricating fluid 398.

A plurality of through holes 410 are formed in the thrust plate 392 on a circumference inward from the annular recess 406 at an equal radial angle pitch. The through holes 410 may be formed on the circumference at random positions.

A rotor hub 412 generally of a circular shape is fixedly mounted on the rotary shaft 388 at its upper end portion. A recording media such as a hard disc is mounted on this rotor hub. An cylindrical rotor yoke 416 is fixed at its upper end to the outer periphery of the rotor hub 412. The rotor yoke 416 has rotor magnets 414 mounted on the inner circumference of the rotor yoke 416 and facing a stator coil 384 with a gap therebetween in the radial direction.

Even if air in an pool 418 at between the bearing R2 and the bearings A3 and A4 expands by a temperature rise, the pressures at the areas inward the annular recess 406 are made equal by the through holes 410. Therefore, the lubricating fluid 398 will not flow to the area inward the dynamic pressure axial bearings A3 and A4.

The thrust plate 392 can be fixed easily to the rotary shaft 388 by fastening them together be the screw 390 by turning it into the threaded inner surface of the shaft 388. The thrust plate 392 is therefore squeezed and fixed between the head of the screw 390 and the lower end of the rotary shaft 388.

An annular recess for reservoiring the lubricating fluid 398 is not formed on the lower annular surface 392b of the thrust plate 392. The reason for this is that the lubricating fluid 398 in the annular recess 396 is reservoired in an sealed circular recess 394a during the halt of the spindle motor, and it is moved toward the dynamic pressure axial bearing during the rotation of the spindle motor.

The advantageous effects of this embodiment are similar to those embodiments described previously.

A fluid such as oil is present in an annular recess which a thrust plate enters. An opening of the annular recess is closed by a cover plate. If the cover plate is bonded by adhesive agent, the fluid in the annular recess may enter the bonding junction and may degrade the hardening of the adhesive agent, resulting in insufficient fixation. A means for fixing the cover plate easily and reliably will be described next.

Figure 13:
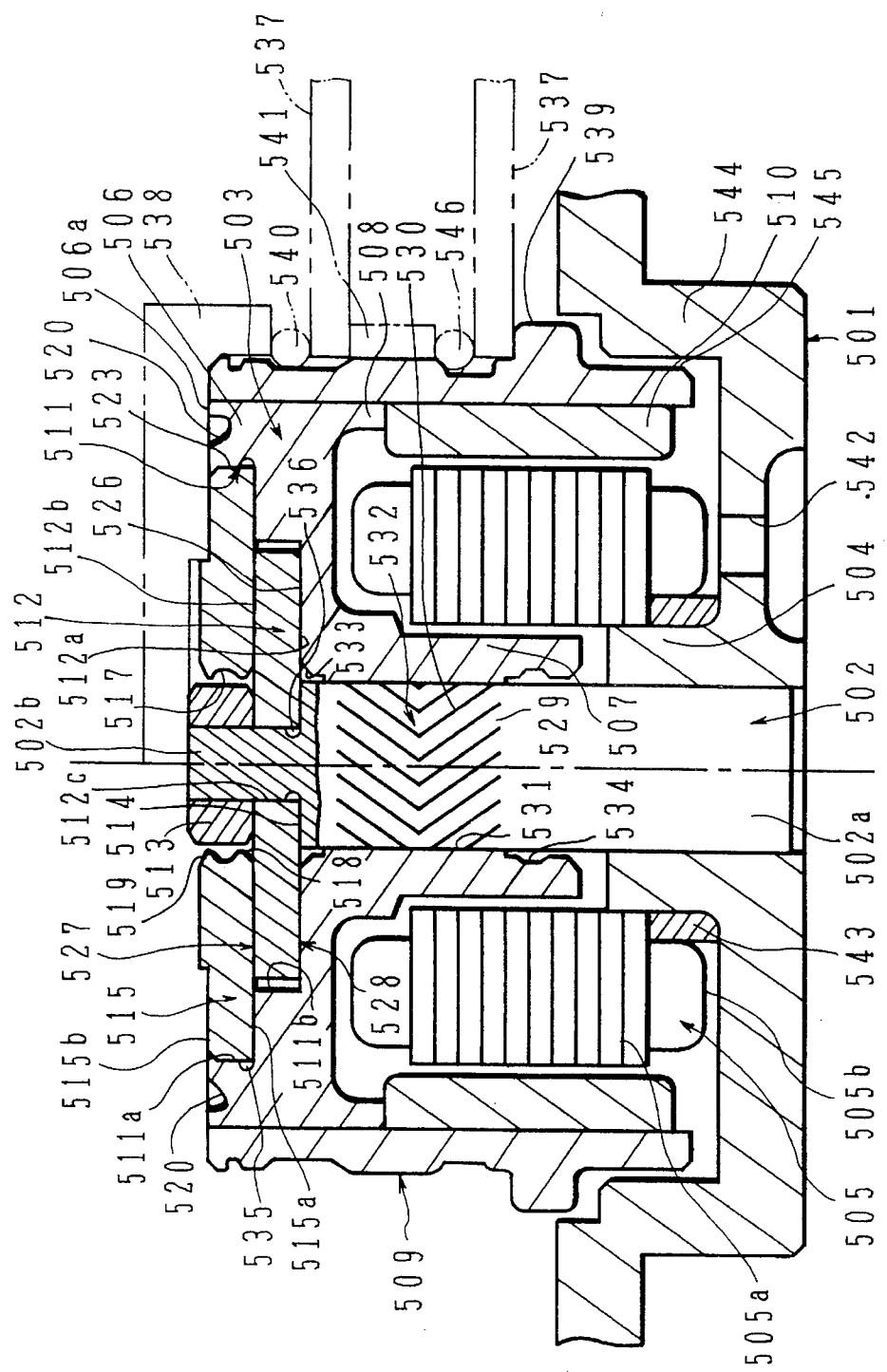
FIG. 13 is a cross section showing a still further embodiment of the spindle motor according to the present invention.

FIG. 13 is a cross section showing another embodiment of the spindle motor according to the present invention. The spindle motor has a shaft 502 one end 502a of which is fixed to a base 501, and a yoke 503 supported rotatably by the shaft 502.

The one end 502a of the shaft 502 is inserted in a boss 504 of the base 501. A starer 505 is fixed to the boss 504.

The yoke 503 is made of, for example, copper alloy, and has an upper wall 506 and a tubular boss 507 depending from the upper wall 506.

A short tubular wall 508 is formed depending from the outer periphery of the upper wall 506.

A tubular hub 509 made of magnetic material such as stainless steel is attached to the outer circumference of the upper wall 506 of the yoke 503.

Rotor magnets 510 are mounted on the circumference of the hub 509, facing the stator 505. The rotor magnets 510 are in contact with the depending wall 508 of the yoke 503.

The starer 505 has a stator core 505a and a stator coil 505b wound about the starer core 505a.

The upper wall 506 of the yoke 503 is formed with a recess 511 having a larger diameter section 511a and a smaller diameter section 511b. The other end 502b of a smaller diameter of the shaft 502 penetrates the recess 511.

A thrust (regulating) plate 512 is mounted around the other end 502b of the shaft 502 in the smaller diameter section 511b of the recess 511.

Specifically, the other end 502b of the shaft 502 is inserted into a center hole 512c of the thrust plate 512. The thrust plate 512 is placed upon a step surface 514 of the shaft 502. A bush 513 is mounted around the other end 502b to thereby fix the thrust plate 512 to the shaft 502.

Upper and lower surfaces 512a and 511b of the thrust plate 512 are formed with spiral grooves for generating the dynamic pressure.

A cover plate 515 is inserted into the larger diameter section 511a of the recess 511.

Figure 17:
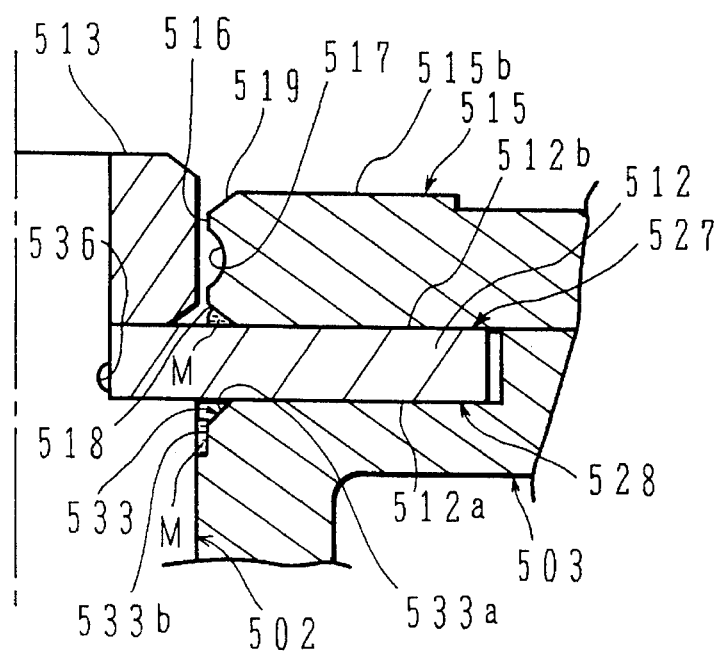
FIG. 17 is a cross section explaining the operation of the spindle motor of FIG. 13.
Figure 18:
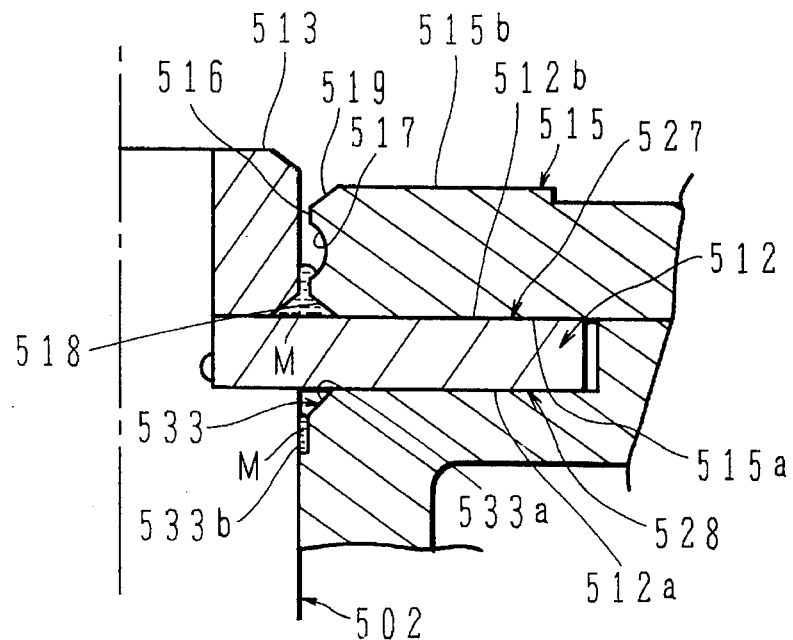
FIG. 18 is another cross section explaining the operation of the spindle motor of FIG. 13.
Figure 19:
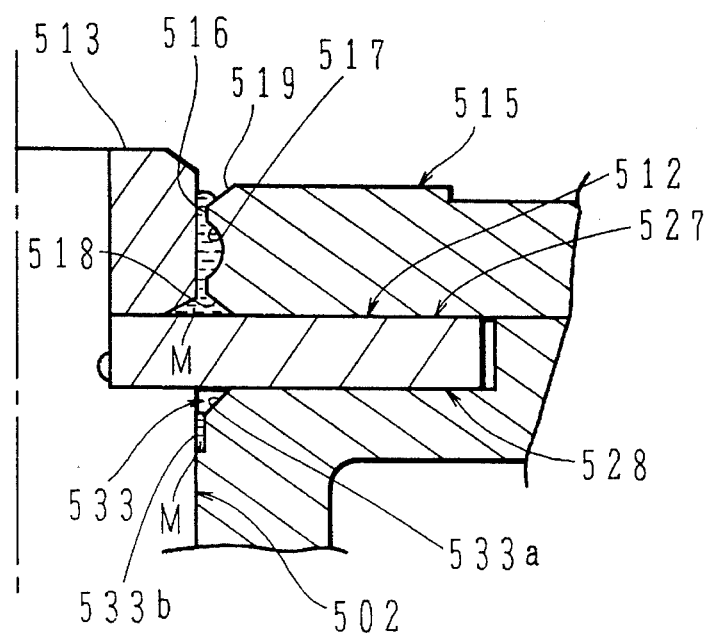
FIG. 19 is another cross section explaining the operation of the spindle motor of FIG. 13.

The cover plate 515 is a disc type plate having a center hole. The inner circumference 516 of the hole is formed with an annular recess 517 having generally a semicircular section as shown in FIGS. 17–19.

The inner circumference 516 is formed with tapers 518 and 519 at the upper and lower positions.

The inner circumference 516 faces the outer circumference of the bush 513 with a small gap therebetween.

Figure 14:
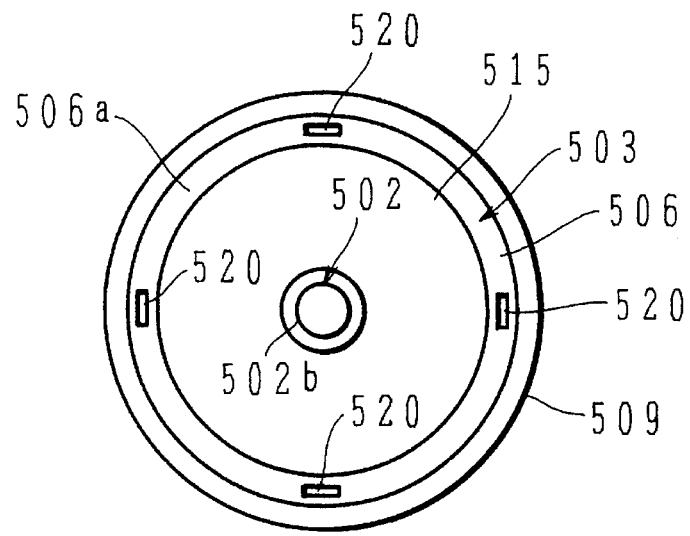
FIG. 14 is a schematic plan view showing part of the spindle motor of FIG. 13.
Figure 15:
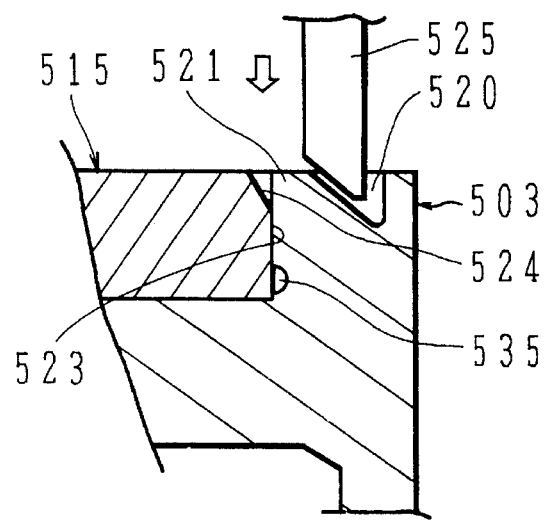
FIG. 15 is an enlarged view in section explaining the basic of how the spindle motor is assembled.
Figure 16:
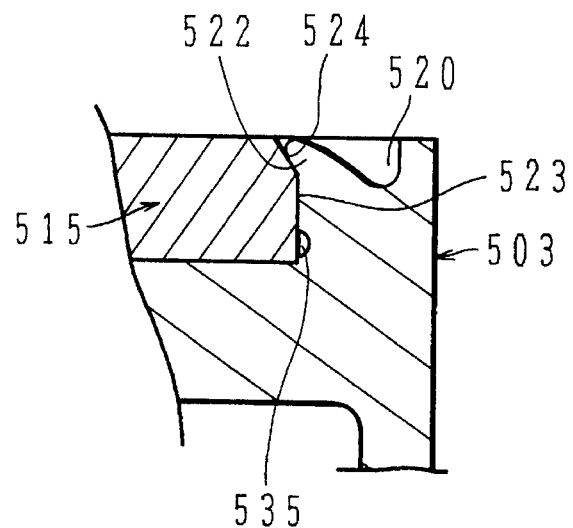
FIG. 16 is an enlarged view in section showing the main part of the assembled spindle motor.

As shown in FIG. 14, the upper surface 506a of the upper wall 506 of the yoke 503 is formed with four recesses 502 at a radial pitch of 90 degrees. As shown in FIGS. 15 and 16, one side 521 of the recess 520 is subjected to plastic deformation inward in the radial direction to form a deformed section 522.

A notch 524 is formed at the top of the outer circumference 5213 of the cover plate 515. The deformed section 522 engages with this notch 524 to couple the yoke 503 and the cover plate 515 together.

Specifically, as shown in FIG. 15, the recess 520 has generally a triangle section before-the cover plate 515 is coupled to the yoke 503. The one side of the recess 520 is struck by a jig 505 to form the deformed section 522 such as shown in FIG. 16. The cover plate 515 and the yoke 503 are coupled together by the plastic deformation (caulking).

The number of deformed sections 522 is not limited to four, but the number of deformed sections 522 may be increased for decreased as desired, by increasing or decreasing the number of recesses 520.

A lubricating fluid such as oil is filled in a gap between the inner surface 512a of the thrust plate 512 and the corresponding area (bottom of the recess 511) of the yoke and between the upper surface 512b of the thrust plate 512 and the lower surface 515a of the cover plate 515.

A dynamic pressure thrust bearing 528 is therefore formed on the side of the lower surface 512a of the thrust plate 512 and a dynamic pressure is generated for pushing the yoke 503 downward in the axial direction. Another dynamic pressure thrust bearing 527 is formed on the side of the upper surface 512b of the thrust plate 512 and a dynamic pressure is generated for pushing the yoke 503 upward downward in the axial direction.

Herringbone grooves 530 are formed on the outer circumference 529 of the shaft 502 at the area corresponding to the cylindrical boss 507 of the yoke 503. A lubricating fluid such as oil is filled in the gap between the outer circumference 529 of the shaft 502 and the inner circumference 531 of the boss 507.

A dynamic pressure radial bearing 552 is therefore formed in between the outer circumference 529 of the shaft 502 and the inner circumference 531 of the boss 507.

As shown in FIGS. 17 to 19, a circumferential notch 533 is formed at the inner circumference 531 of the cylindrical boss 507 on the side of the regulating plate 512.

This notch 533 is defined by a main part 533a having generally a triangular section and a subsidiary part 533b having generally a rectangular section.

Figure 20:
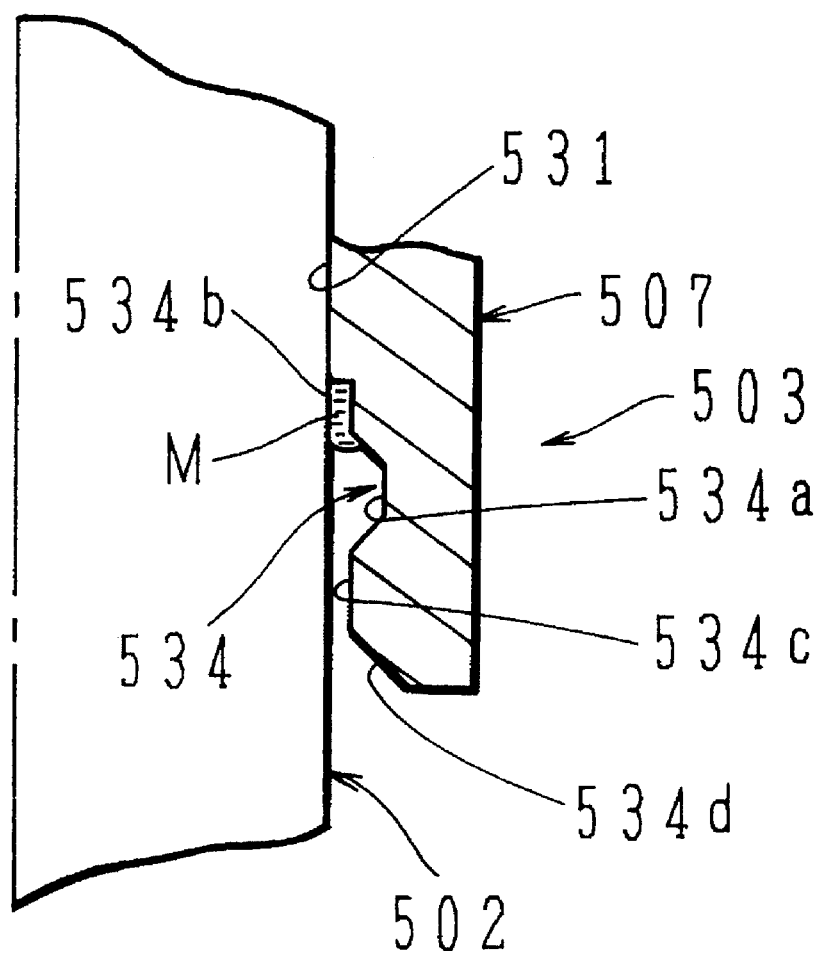
FIG. 20 is an enlarged cross section showing the main part of the yoke of FIG. 13.

As shown in FIG. 20, a circumferential groove 534 is formed on the inner circumference 531 of the boss 507 at the distal end portion thereof.

This circumferential groove 534 is defined by a main part 534a having generally a trapezoidal section and a pair of subsidiary parts 534b and 534c having generally a, rectangular section.

As shown in FIG. 13, circumferential grooves 535 and 536 are formed respectively on the inner circumference of the large diameter section 511a of the recess 511 at the lower end portion and on the outer circumference of the other end 502b of the shaft 502 at the lower end portion.

As indicated by phantom lines in FIG. 13, discs 537 are mounted around the outer circumference of the hub 509.

As also indicated by another phantom line in FIG. 13, a clamp ring 540, 546 are mounted to hold the discs 537. The discs 537 are interposed between the clamp ring 540 (and 546) and a projection 539 formed on the outer circumference of the hub 509 via the spacer 541. In FIG. 13, reference numeral 540 represents a ring, reference numeral 541 represents a spacer, and reference numeral 542 represents a hole formed in the base 501. Lead wires from the stator coil 505b of the stator 505 are passed through this hole.

A stator holder 543 made of synthetic resin is mounted on the boss 504 of the base 501 to hold the stator 505.

Since the stator holder 543 is made of synthetic resin, the height of the stator 505 in the axial direction can be easily set, and vibrations generated by the stator 505 can be efficiently absorbed.

In the spindle motor constructed as above, the yoke 503 and hub 509 are rotatably supported by the dynamic pressure radial bearing 532 and can be held at a predetermined portion in the axial direction by the dynamic pressure thrust bearings 527 and 528.

If lubricating fluid M such as oil filled in the gap between the cover plate 515 and the thrust plate 512 flows toward the inner circumference 516 of the cover plate 515, the contour of the fluid M is rounded by the surface tension by the function of the taper 518 of the cover plate 515 so that it is difficult to flow further.

Even if the fluid M flows further toward the circumferential groove 517 as shown in FIG. 18, the contour of the fluid M is rounded again by the surface tension at this position so that it is difficult to flow further.

Even if the fluid M flows further into the circumferential groove 517 as shown in FIG. 19, the contour of the fluid M is rounded again by the surface tension at this position so that it is difficult to flow further.

If the fluid M at the dynamic pressure radial bearing 532 flows toward the thrust plate 512, the notch 533 effectively eliminates the leak of the fluid as shown in FIGS. 17 and 18.

Namely, if the fluid M flows into the main part 533a of the notch 533, the contour of the fluid M is rounded by the surface tension so that it is difficult to flow further.

Similarly, if the fluid M flows toward the boss 504 of the base 501, the circumferential groove 534 effectively eliminates the leak of the fluid as shown in FIG. 20.

Namely, if the fluid M flows into the main part 534a of the circumferential groove 534, the contour of the fluid M is rounded by the surface tension so that it is difficult to flow further. The taper 534d also functions in the same manner.

The subsidiary part 533b of the notch 533 and the subsidiary part 534b of the circumferential groove 534 hold the fluid at the subsidiary parts 533b and 534b or 534c by the capillarity and effectively eliminates the leak of the fluid M in corporation with the surface tension.

The circumferential groove 535 formed on the larger diameter section 511a of the yoke 503 functions as an oil pool groove which prevents the fluid M near at the thrust plate 512 From flowing toward the outer surface 515b of the cover plate 515 when it is fitted in the larger diameter section 511a.

The depending wall 508 of the yoke 503 abuts against the rotor magnets 510 so that the latter can be precisely positioned.

The base 501 is formed with an upright wall 544 outward of the boss 504. The end of the hub 509 is inserted in the space defined by the upright wall 544.

A labyrinth seal structure 545 is formed between the inner surface of the upright wall 544 and the outer surface of the hub 509 to prevent the fluid such as oil from draining out of the spindle motor.

Figure 21:
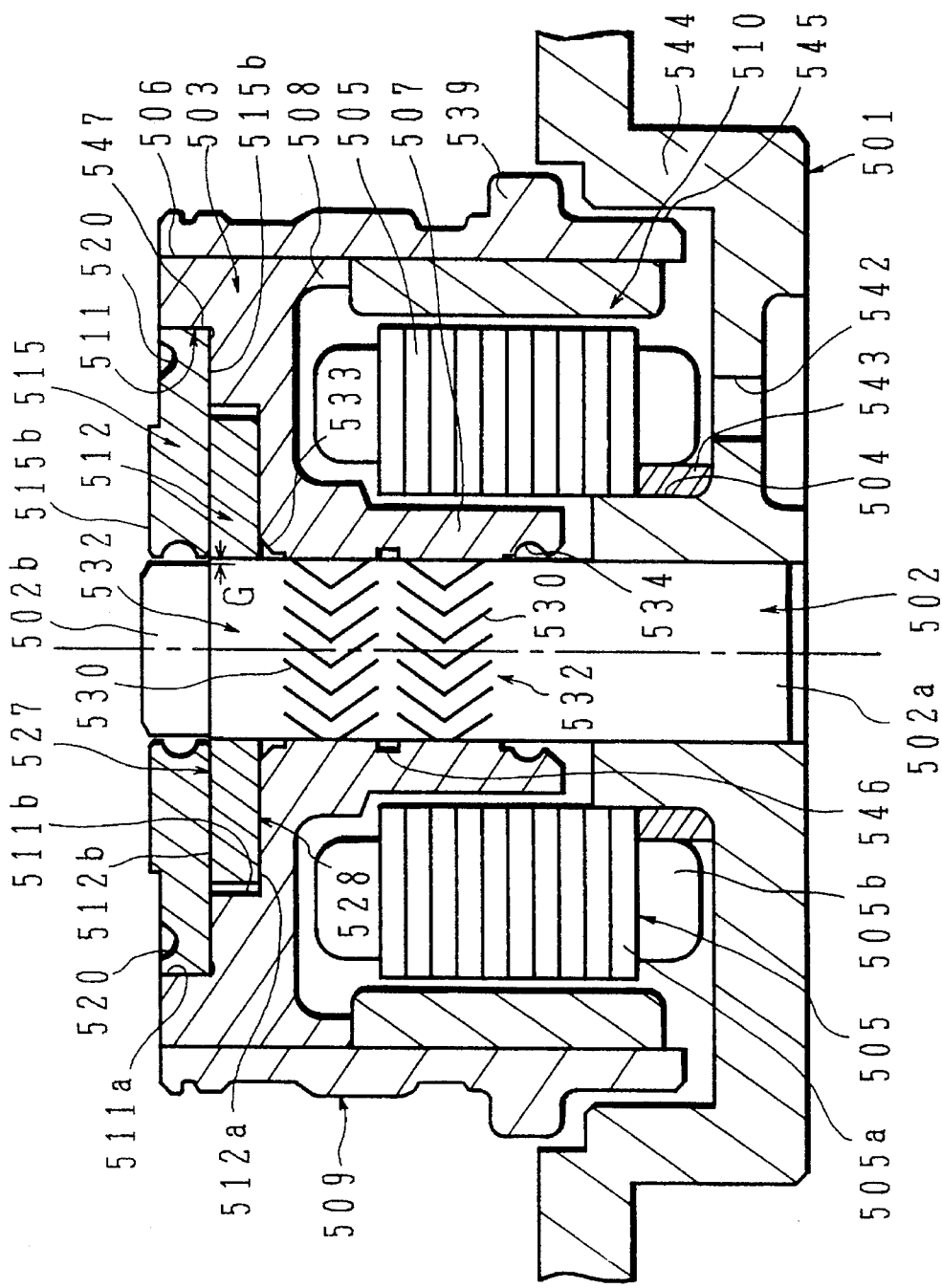
FIG. 21 is a cross section showing another embodiment of the spindle motor according to the present invention.

FIG. 21 is a cross section showing another embodiment of the spindle motor according to the present invention. In this embodiment, recesses 520 are formed on the surface of the cover plate 515. The cover plate 515 is caulked to couple the yoke 503 and cover plate 515 together.

Figure 22:
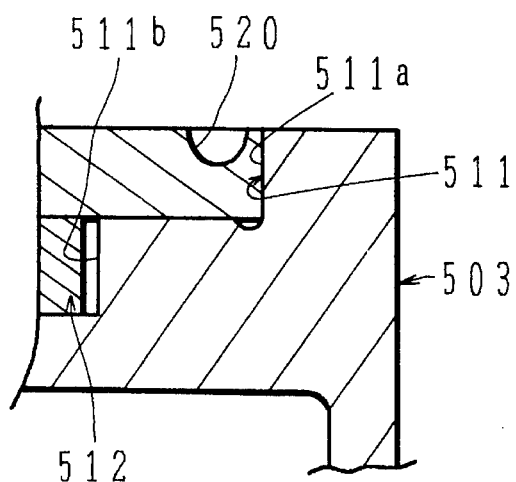
FIG. 22 is an enlarged view in section explaining the basic of how the spindle motor is assembled.
Figure 23:
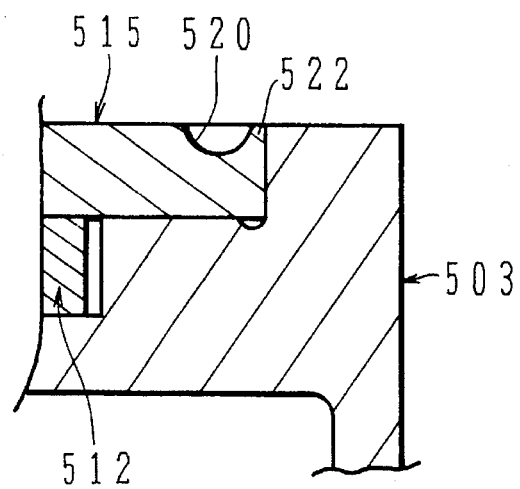
FIG. 23 is an enlarged view in section showing the main part of the assembled spindle motor.

As shown in FIGS. 22 and 23, the deformed section 522 is formed by the plastic deformation by using the jig 525 shown in FIG. 15 at the outer edge portion of the larger diameter section 511a of the yoke 503, to thereby couple the yoke 503 and cover plate 515 together.

As shown in FIG. 21, the shaft 502 is provided with a pair of groove forming surfaces 530 to form a pair of dynamic pressure radial bearings 532 in the spindle motor.

A small circumferential groove 546 is formed between the notch 533 and circumferential groove 534 at the position between the groove forming surfaces 530. An oil pool 547 is formed on the bottom of the larger diameter section 511a of the yoke 503.

The thrust plate 512 is fitted around the larger diameter portion of the shaft 502 and fixed thereto to omit the bush 513 shown in FIG. 13.

The other structure is the same as the embodiment shown in FIG. 13, and so the description thereof is omitted.

Similar to the spindle motor shown in FIG. 13, in the spindle motor shown in FIG. 21, the yoke 503 and hub 509 are rotatably supported by the dynamic pressure radial bearings 532, and are held at the predetermined position in the axial direction by the dynamic pressure thrust bearings 527 and 528, while effectively eliminating the leak of the lubricating fluid M such as oil at the bearings 527, 528, and 532.

In this embodiment, a pair of dynamic pressure radial bearings 532 are provided in the axial direction, thereby improving the rigidity of the radial bearings and allowing the yoke 503 and hub 509 to rotate stably.

Since the bush 513 of the embodiment shown in FIG. 13 can be omitted, the number of components is reduced and the working amount for the shaft step can be reduced. Namely, the step G at the other end 502a of the shaft 502 can be made very small.

The spiral groove for the dynamic pressure thrust bearing 528 may be formed on the corresponding area 526 of the thrust plate 512 in place of the lower surface 512a of the plate, and the spiral groove for the dynamic pressure thrust bearing 527 may be formed on the lower surface 515a of the cover plate 515 in place of the upper surface 512a of the thrust plate 512. Further, the shaft 502 and thrust plate 512 may be formed integrally. Still further, the grooves for the dynamic pressure radial bearing 532 may be formed on the inner circumference 531 of the cylindrical boss 507 instead of the shaft 502.

As described above, the cover plate 515 can be fixedly mounted on the yoke 503 by means of the plastic deformation working without using an adhesive agent. This fixation can be reliably realized without any adverse effects of the lubricating fluid M such as oil used at the bearings 527, 528, and 532.

The cover plate 515 is not required to be fitted in the associated component so that a high working precision is not necessary, facilitating the manufacturing and reducing the cost.

The cover plate 515 and yoke 508 are coupled together by the plastic deformation working, reducing the time required for it extremely and providing a good productivity.

The present invention has been described in connection with the above embodiments. The invention is not limited to only the embodiments, but obviously various changes, improvements, combinations, and the yoke are possible by those skilled in the art.

We claim:

1. A spindle motor comprising:
   a stator having a stator coil for generating a magnetic field during excitation of said stator coil:
   a rotor having rotor magnets for receiving rotational force in cooperation with said magnetic field generated by said stator coil;
   a first dynamic pressure bearing formed at an area where said stator and said rotor face each other, said area being filled with a lubricating material, and said first dynamic pressure bearing having at least one groove of a predetermined shape; and
   rotation direction controlling means for controlling said rotor to rotate in such direction that said lubricating material is pushed radially solely outwardly from the axis of said rotor by rotation of said groove of said first dynamic pressure bearing.

2. The spindle motor according to claim 1, wherein said first dynamic pressure bearing is a dynamic pressure thrust bearing formed on a side of an end surface of a rotary shaft of said rotor and said groove is of a spiral shape.

3. The spindle motor according to claim 1, further comprising a dynamic pressure thrust and radial bearing formed at the area between said rotor and said stator, said dynamic pressure thrust and radial bearing having a groove of generally a chevron pattern having a deflection point and a length of a line deflected in one direction from said deflection point being different from a length of another line deflected in another direction from said deflection point.

4. The spindle motor according to claim 1, wherein said rotor is of a cylindrical shape.

5. The spindle motor according to claim 4, wherein said stator has a cylindrical hole.

6. The spindle motor according to claim 5, wherein said at least one groove of the first dynamic pressure bearing is formed on an end surface of said rotor.

7. A spindle motor comprising:
   a stator having a stator coil for generating a magnetic field during excitation of said stator coil, said stator having a first circumference:
   a rotor having rotor magnets for receiving a rotational force in cooperation with said magnetic field generated by said stator coil, said rotor having a second circumference facing said first circumference; and
   a dynamic pressure thrust and radial bearing having at least one groove of generally a chevron pattern formed on one of said first circumference of said stator and said second circumference of said rotor, said chevron pattern having a deflection point and a length of a line deflected in one direction from said deflection point being different from a length of another line deflected in another direction from said deflection point.

8. A spindle motor comprising:
   a stator having a stator coil for generating a magnetic field during excitation of said stator coil;
   a hub having rotor magnets for receiving rotation force in cooperation with said magnetic field generated by said stator coil;
   a rotary shaft concentrically mounted on said hub, one end of said shaft being fixed to said hub and the other end being a free end;
   a sleeve having an upper open and and a closed bottom end fixed to said stator for rotatably supporting said rotary shaft, said sleeve generally defining a cylindrical hole having a bottom;
   a first dynamic pressure thrust beating formed at an area between a bottom of a hole of said sleeve and said free end of said rotary shaft, said area being filled with a lubricating material, and said first dynamic pressure thrust bearing having at least one groove of a predetermined shape;
   a second dynamic pressure thrust beating informed at an area between an upper end surface of a hole of said sleeve and the corresponding lower surface of said hub, said area being filled with said lubricating material, and said second dynamic pressure thrust bearing having at least one groove of a predetermined shape; and
   rotation direction controlling means for controlling said hub to rotate in such a direction that said lubricating material is pushed outwardly from axis of said rotary shaft by said first dynamic pressure thrust bearing, and controlling said hub to rotate in such a direction that said lubricating material is pushed from both inner and outer peripheries of an upper surface of the cylinder toward an intermediate radial portion thereof.

9. The spindle motor according to claim 7, wherein said first and second dynamic pressure thrust bearings have different dynamic pressure generating areas defined by parameters including number and motion radius of said grooves during rotation.

10. The spindle motor according to claim 7, wherein said free end of said rotary shaft includes a rotary shaft pivotal member substantially in point contact with the bottom of said sleeve, and the upper end surface of said sleeve and the corresponding lower surface of said hub are disposed with a gap therebetween in an axial direction.

11. The spindle motor according to claim 7, wherein said rotation direction controlling means controls said hub to rotate in such a direction that said hub departs from said sleeve by said first dynamic pressure thrust bearing and approaches to said sleeve by said second dynamic pressure thrust bearing.

12. The spindle motor according to claim 7, wherein said rotation direction controlling means controls said hub to rotate in such a direction that said hub approaches to said sleeve by said first dynamic pressure thrust bearing and departs from said sleeve by said second dynamic pressure thrust bearing.

13. A spindle motor comprising:
   a rotary shaft of generally a cylindrical shape having an outer circumference and a circular projection extending outward from the rotary shaft in a radial direction of said rotary shaft, said circular projection having upper and lower annular disk surfaces perpendicular to said outer circumference of said rotary shaft;

a sleeve having an inner circumference of generally a tubular shape and an annular recess formed in the inner circumference opening inwardly in the radial direction having upper and lower surfaces parallel to said upper and lower annular disk surfaces, said outer circumference of said rotary shaft being fitted to said inner circumference of said sleeve, and said circular projection entering said annular recess;

a dynamic pressure radial bearing formed at an area between said outer circumference of said rotary shaft and said inner circumference of said sleeve, said dynamic pressure radial bearing being filled with a lubricating material and having a groove of a predetermined shape;

a dynamic pressure axial bearing formed at an area between said upper and lower annular disk surfaces of said circular projection and said upper and lower surfaces of said annular recess, said dynamic pressure axial bearing being filled with said lubricating material and having a groove of a predetermined shape;

an annular recess formed on one of said upper and lower annular disk surfaces of said circular projection at a position inwardly in the radial direction from said groove of said dynamic pressure axial bearing, said annular recess of said circular projection forming an obtuse angle between an inner surface of said annular recess and said lubricating material; and rotation controlling means for controlling rotational direction such that said lubricating material at said dynamic pressure axial bearing is caused to flow outward in the radial direction upon relative rotation of said rotary shaft and said sleeve.

14. The spindle motor according to claim 13, wherein said circular projection has at least one through hole in an axial direction of said rotary shaft at the position inward in the radial direction from said groove of said dynamic pressure axial bearing.

15. A spindle motor comprising:

a shaft of generally a cylindrical shape;

a yoke rotatably supported by said shaft, said yoke having a hole of generally a cylindrical shape and a recess perpendicular to a rotary axis of said shaft;

a dynamic pressure radial bearing formed at an area between an outer circumference of said shaft and said yoke, said dynamic pressure radial bearing being filled with a lubricating material;

a thrust plate fixed to said shaft, said thrust plate being perpendicular to the rotary axis;

a cover plate fitted in said recess of said yoke, said cover plate sandwiching said thrust plate with said yoke;

a dynamic pressure thrust bearing formed at areas between said thrust plate and said cover plate and between said thrust plate and said yoke, said dynamic pressure thrust bearing being filled with said lubricating material; and a coupling section formed between said cover plate and said yoke by means of plastic deformation.

\* \* \* \* \*

UNITED STATES PATENT AND TRADEMARK OFFICE
CERTIFICATE OF CORRECTION

PATENT NO. : 5,559,382
DATED : September 24, 2996
INVENTOR(S) : Yosito Oku; Shozo Ibara; Shigeharu Sumi; Hiromasa Fujii It is certified that error appears in the above-indentified patent and that said Letters Patent is hereby corrected as shown below:

In <u>Claim 8, Column 20</u>:

Line 18, change "and" to end--.

Line 22, delete "beating" and substitute --bearing--.

Line 28, delete "beating informed" and substitute --bearing formed--.

Signed and Sealed this

Eleventh Day of February, 1997

Attest:

BRUCE LEHMAN

Attesting Officer    Commissioner of Patents and Trademarks